(12) United States Patent
Liu et al.

(10) Patent No.: US 12,368,669 B2
(45) Date of Patent: Jul. 22, 2025

(54) PACKET SENDING METHOD, DEVICE, AND SYSTEM

(71) Applicant: Huawei Technologies Co., Ltd., Shenzhen (CN)

(72) Inventors: Shuying Liu, Beijing (CN); Sheng Fang, Beijing (CN); Xiugang Wei, Beijing (CN); Yaqun Xiao, Beijing (CN); Fang Gao, Shenzhen (CN); Guoqi Xu, Beijing (CN); Zhibo Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 95 days.

(21) Appl. No.: 18/324,676

(22) Filed: May 26, 2023

(65) Prior Publication Data
US 2023/0300070 A1    Sep. 21, 2023

Related U.S. Application Data

(63) Continuation of application No. PCT/CN2021/073628, filed on Jan. 25, 2021.

(30) Foreign Application Priority Data

Nov. 27, 2020 (CN) .......................... 202011368375.5

(51) Int. Cl.
*H04L 45/00* (2022.01)
*H04L 45/42* (2022.01)
*H04L 45/74* (2022.01)

(52) U.S. Cl.
CPC ............ *H04L 45/566* (2013.01); *H04L 45/42* (2013.01); *H04L 45/74* (2013.01)

(58) Field of Classification Search
CPC ....... H04L 45/74; H04L 45/124; H04L 45/20; H04L 47/24; H04L 47/822; H04L 45/566; H04L 45/42
(Continued)

(56) References Cited

U.S. PATENT DOCUMENTS 10,764,175 B1 * 9/2020 Filsfils .................... H04L 45/20
11,095,559 B1 * 8/2021 Garvia ................. H04L 45/124
(Continued)

FOREIGN PATENT DOCUMENTS

| CN | 110266594 A | 9/2019 |
|----|-------------|--------|
| CN | 110912795 A | 3/2020 |

(Continued)

OTHER PUBLICATIONS

D. Dukes, Ed., et al: "SR For SDWAN: VPN with Underlay SLA draft-dukes-spring-sr-for-sdwan-02", IETF, Jun. 10, 2019, total 16 pages.

*Primary Examiner* — Jungwon Chang
(74) *Attorney, Agent, or Firm* — SLATER MATSIL, LLP

(57) ABSTRACT

A packet sending method and a related device are disclosed. The method includes: A network device obtains a first packet, where an internet protocol extension header of the first packet includes a first identifier, and the first identifier indicates a service requirement corresponding to the first packet. The network device determines, based on the first identifier and a second identifier, path indication information corresponding to the first packet, where a destination address of the first packet includes the second identifier, and the path indication information herein includes one or more of a network slice identifier and a segment identifier list. The network device updates the first packet based on the path indication information to obtain a second packet, and sends the second packet.

20 Claims, 11 Drawing Sheets

(58) Field of Classification Search
USPC .......................................................... 709/238
See application file for complete search history.

(56) References Cited

U.S. PATENT DOCUMENTS

| | | | |
|---|---|---|---|
| 2017/0237656 A1* | 8/2017 | Gage | ................... H04L 61/2521 |
| | | | 370/392 |
| 2020/0008067 A1 | 1/2020 | Filsfils et al. | |
| 2021/0083933 A1* | 3/2021 | Bull | ........................ H04L 47/24 |
| 2021/0153079 A1* | 5/2021 | Hu | ......................... H04L 47/822 |
| 2022/0052945 A1* | 2/2022 | Peng | ................... H04L 12/4633 |

FOREIGN PATENT DOCUMENTS

| | | |
|---|---|---|
| CN | 111107004 A | 5/2020 |
| CN | 111225420 A | 6/2020 |

* cited by examiner

PACKET SENDING METHOD, DEVICE, AND SYSTEM

CROSS-REFERENCE TO RELATED APPLICATIONS

This application is a continuation of International Application No. PCT/CN2021/073628, filed on Jan. 25, 2021, which claims priority to Chinese Patent Application No. 202011368375.5, filed on Nov. 27, 2020. The disclosures of the aforementioned applications are hereby incorporated by reference in their entireties.

TECHNICAL FIELD

This application relates to the field of communication technologies, and in particular, to a packet sending method, a device, an apparatus, a system, and a computer-readable storage medium.

BACKGROUND

In some scenarios, for example, a cloud computing scenario, computing tasks are distributed in a resource pool including a large quantity of computers, so that various application systems can obtain computing capabilities, storage space, and various software services as required. In a cloud computing system, cloud servers may be deployed in a centralized manner, and application systems may be run on the cloud server, so that a user, such as an individual user or an enterprise user, accesses the cloud server by using a terminal.

A manner in which a user accesses a cloud server by using a terminal is usually as follows: A provider establishes an end-to-end connection tunnel between a metropolitan area network connected to the terminal of the user and a core network on which the cloud service is located, so that the user accesses the cloud server based on the tunnel. Using the tunnel can ensure network quality of the user.

In this tunnel establishment manner, different tunnels or traffic engineering tunnels usually need to be configured for different users or different services. This leads to a massive quantity of tunnels or traffic engineering tunnels and a complex network.

SUMMARY

This application provides a packet sending method, an apparatus, a device, and a system, and a computer-readable storage medium, to resolve a problem in a related technology. Technical solutions are as follows:

According to a first aspect, a packet sending method is provided. The method includes: A first network device obtains a first packet, where an internet protocol (Internet Protocol, IP) extension header of the first packet includes a first identifier, and the first identifier indicates a service requirement corresponding to the first packet; after obtaining the first packet, the first network device may determine, based on the first identifier and a second identifier, path indication information corresponding to the first packet, where a destination address of the first packet includes the second identifier, and the path indication information includes a network slice identifier and/or a segment identifier list; and the first network device updates the first packet based on the path indication information to obtain a second packet, and sends the second packet.

The path indication information, for example, the network slice identifier and/or the segment identifier list, corresponding to the packet is determined based on the first identifier and the second identifier that correspond to the service requirement and that are in the obtained packet, so that the packet can be forwarded based on a forwarding tunnel indicated by the corresponding network slice or segment identifier list, to reduce tunnel configurations in a network, and simplifying the network.

In a possible implementation, the second identifier includes a segment identifier. In an example, the segment identifier is a VPN segment identifier or an intent segment identifier.

In a possible implementation, the foregoing method for determining the path indication information based on the first identifier and the second identifier includes: determining a forwarding policy of the first packet based on the second identifier, where the forwarding policy includes a first correspondence between the first identifier and the path indication information; and determining the path indication information based on the first identifier and the first correspondence.

In a possible implementation, the foregoing method for determining the path indication information based on the first identifier and the second identifier includes: determining, based on the first identifier, a third identifier corresponding to the first identifier; determining a forwarding policy of the first packet based on the second identifier, where the forwarding policy includes a second correspondence between the third identifier and the path indication information; and determining the path indication information based on the third identifier and the second correspondence.

According to a second aspect, a packet sending method is provided. The method includes: A first network device obtains a first packet, where an internet protocol IP packet header of the first packet includes a first identifier, and the first identifier indicates a service requirement corresponding to the first packet; after obtaining the first packet, the first network device determines corresponding path indication information based on the first identifier, where the path indication information includes a network slice identifier; and the first network device updates the first packet based on the path indication information to obtain a second packet, and sends the second packet.

In a possible implementation, the first network device includes a correspondence between the first identifier and the path indication information, and an implementation of determining the corresponding path indication information based on the first identifier is: determining the path indication information based on the first identifier and the correspondence.

In a possible implementation, the first identifier includes a network slice segment identifier, and the first identifier indicates the first network device to determine the network slice identifier based on the first identifier.

With reference to any possible implementation of the second aspect or the first aspect, in a possible implementation, the second packet includes the path indication information. In a possible implementation, the path indication information is the network slice identifier, and an HBH or a destination options header of the second packet includes the network slice identifier.

With reference to any possible implementation of the second aspect or the first aspect, in a possible implementation, the first identifier includes a segment identifier, a segment routing header SRH of the first packet includes the first identifier, and the IP extension header includes the SRH.

With reference to any possible implementation of the second aspect or the first aspect, in a possible implementation, the first identifier includes an intent segment identifier, and the intent segment identifier indicates the first network device to determine the corresponding path indication information based on the first identifier. In a possible implementation, the first identifier further includes an indication identifier, and the indication identifier indicates that the first identifier is an intent segment identifier.

According to a third aspect, a packet sending method is provided. The method includes: obtaining, by a first network device, a first packet, where a hop-by-hop HBH options header or a destination options header of the first packet includes a first identifier, and the first identifier indicates a service requirement corresponding to the first packet; after obtaining the first packet, the first network device may determine, based on the first identifier, path indication information corresponding to the first packet, where the path indication information includes a segment identifier list; and the first network device updates the first packet based on the segment identifier list to obtain a second packet, and sends the second packet.

In a possible implementation, the second packet includes the segment identifier list.

In a possible implementation, the first identifier includes an intent identifier, the HBH or the destination options header of the first packet includes the intent identifier, and the IP extension header includes the HBH or the destination options header.

With reference to any possible implementation of the first aspect, the second aspect, or the third aspect, that the first network device obtains a first packet includes: The first network device receives a packet sent by a second network device, where the packet includes the first identifier. The first packet is a packet sent by the second network device, or the first network device may generate the first packet based on the packet sent by the second network device. The first network device belongs to a first network, the second network device belongs to a second network, and the first network is different from the second network.

In a possible implementation, at least two network devices included in the first network may perform the step of determining corresponding path indication information based on the first identifier, and the at least two network devices include the first network device.

In a possible implementation, at least two network devices included in the second network may alternatively perform the step of determining corresponding path indication information based on the first identifier.

In a possible implementation, the first network and the second network belong to different interior gateway protocol IGP domains, or the first network and the second network belong to different autonomous systems ASs.

In a possible implementation, the first network is a network that supports network slicing, and the second network is a network that supports SRv6.

In a possible implementation, the network slice identifier includes a slice identifier SliceID and/or a flexible algorithm identifier.

According to a fourth aspect, a packet sending method is provided. The method includes: A first network device obtains a first identifier, where the first identifier corresponds to a service requirement; the first network device generates a first packet, where an internet protocol IP extension header of the first packet includes the first identifier, the first packet further includes a second identifier, and a destination address of the first packet includes the second identifier or a segment routing header SRH of the first packet includes the second identifier; and the first network device sends the first packet to a second network device, where the first identifier and the second identifier in the first packet are for enabling the second network device to determine, based on the first identifier and the second identifier, path indication information corresponding to the first packet, and the path indication information includes a network slice identifier and/or a segment identifier list.

In a possible implementation, the second identifier includes a virtual private network segment identifier VPN SID or an intent segment identifier.

In a possible implementation, a hop-by-hop options header or a destination options header of the first packet includes the first identifier.

According to a fifth aspect, a packet sending method is provided. The method includes: A first network device obtains a first identifier, where the first identifier corresponds to a service requirement; the first network device generates a first packet, where a hop-by-hop HBH options header or a destination options header of the first packet includes the first identifier; and the first network device sends the first packet to a second network device, where the first identifier is for enabling the second network device to determine, based on the first identifier, path indication information corresponding to the first packet, and the path indication information includes a first segment identifier list.

In a possible implementation, the first identifier includes an intent identifier.

In a possible implementation, the obtaining a first identifier is specifically: The first network device receives a second segment identifier list sent by a control device, where the second segment identifier list includes the first identifier.

According to a sixth aspect, an identifier sending method is provided. The method includes: A control device obtains a first identifier, where the first identifier corresponds to a service requirement; determines a first segment identifier list corresponding to a target service, where the first segment identifier list includes the first identifier, the first segment identifier list indicates a first forwarding path that a packet corresponding to the target service passes through, the first forwarding path passes through a first network device included in a first network, the first identifier is for enabling the first network device to determine corresponding path indication information based on the first identifier, and the path indication information includes a network slice identifier and/or a second segment identifier list; and the first network device sends the first segment identifier list.

In a possible implementation, at least two network devices included in the first network may perform the step of determining corresponding path indication information based on the first identifier, and the at least two network devices included in the first network include the first network device.

In a possible implementation, the first segment identifier list is carried in a link state protocol packet or a path computation element communication protocol packet for sending.

According to a seventh aspect, a network device is provided. The network device includes an obtaining module, a processing module, and a sending module. The obtaining module is configured to obtain a first packet, where an internet protocol IP extension header of the first packet includes a first identifier, and the first identifier indicates a service requirement corresponding to the first packet. The processing module is configured to determine, based on the first identifier and a second identifier, path indication information corresponding to the first packet, where a destination address of the first packet includes the second identifier, and the path indication information includes a network slice identifier and/or a segment identifier list. The processing module is further configured to update the first packet based on the path indication information to obtain a second packet. The sending module is configured to send the second packet.

In a possible implementation, the processing module is configured to determine a forwarding policy of the first packet based on the second identifier, where the forwarding policy includes a first correspondence between the first identifier and the path indication information. The processing module is further configured to determine the path indication information based on the first identifier and the first correspondence.

In a possible implementation, the processing module is configured to determine, based on the first identifier, a third identifier corresponding to the first identifier. The processing module is further configured to determine a forwarding policy of the first packet based on the second identifier, where the forwarding policy includes a second correspondence between the third identifier and the path indication information. The processing module is further configured to determine the path indication information based on the third identifier and the second correspondence.

According to an eighth aspect, a network device is provided. The network device includes an obtaining module, a processing module, and a sending module. The obtaining module is configured to obtain a first packet, where an internet protocol IP packet header of the first packet includes a first identifier, and the first identifier indicates a service requirement corresponding to the first packet. The processing module is configured to determine corresponding path indication information based on the first identifier, where the path indication information includes a network slice identifier. The processing module is further configured to update the first packet based on the path indication information to obtain a second packet. The sending module is configured to send the second packet.

In a possible implementation, the processing module is configured to determine the path indication information based on the first identifier and a correspondence, where the correspondence is a correspondence between the first identifier and the path indication information.

In a possible implementation, the processing module is configured to encapsulate the path indication information in the second packet.

According to a ninth aspect, a network device is provided. The network device includes an obtaining module, a processing module, and a sending module. The obtaining module is configured to obtain a first packet, where a hop-by-hop HBH options header or a destination options header of the first packet includes a first identifier, and the first identifier indicates a service requirement corresponding to the first packet. The processing module is configured to determine, based on the first identifier, path indication information corresponding to the first packet, where the path indication information includes a segment identifier list. The sending module is configured to update the first packet based on the segment identifier list to obtain a second packet, and send the second packet.

In a possible implementation, the processing module is configured to encapsulate the segment identifier list in the second packet.

According to a tenth aspect, a network device is provided. The network device includes an obtaining module, a processing module, and a sending module. The obtaining module is configured to obtain a first identifier, where the first identifier corresponds to a service requirement. The processing module is configured to generate a first packet, where an internet protocol IP extension header of the first packet includes the first identifier, the first packet further includes a second identifier, and a destination address of the first packet includes the second identifier or a segment routing header SRH of the first packet includes the second identifier. The sending module is configured to send the first packet to a second network device, where the first identifier and the second identifier are for enabling the second network device to determine, based on the first identifier and the second identifier, path indication information corresponding to the first packet, and the path indication information includes a network slice identifier and/or a segment identifier list.

According to an eleventh aspect, a network device is provided. The network device includes an obtaining module, a processing module, and a sending module. The obtaining module is configured to obtain a first identifier, where the first identifier corresponds to a service requirement. The processing module is configured to generate a first packet, where an IP packet header of the first packet includes the first identifier. The sending module is configured to send the first packet to a second network device, where the first identifier is for enabling the second network device to determine corresponding path indication information based on the first identifier, and the path indication information includes a network slice identifier.

According to a twelfth aspect, a network device is provided. The network device includes an obtaining module, a processing module, and a sending module. The obtaining module is configured to obtain a first identifier, where the first identifier corresponds to a service requirement. The processing module is configured to generate a first packet, where a hop-by-hop HBH options header or a destination options header of the first packet includes the first identifier. The sending module is configured to send the first packet to a second network device, where the first identifier is for enabling the second network device to determine corresponding path indication information based on the first identifier, and the path indication information includes a segment identifier list.

According to a thirteenth aspect, a control device is provided. The control device includes an obtaining module, a processing module, and a sending module. The obtaining module is configured to obtain a first identifier, where the first identifier corresponds to a service requirement. The processing module is configured to determine a first segment identifier list corresponding to a target service, where the first segment identifier list includes the first identifier, the first segment identifier list indicates a first forwarding path that a packet corresponding to the target service passes through, the first forwarding path passes through a first network device included in a first network, the first identifier is for enabling the first network device to determine corresponding path indication information based on the first identifier, and the path indication information includes a network slice identifier and/or a second segment identifier list. The sending module is configured to send the first segment identifier list.

In a possible implementation, the processing module is configured to calculate the first segment identifier list based on the service requirement corresponding to the target service.

According to a fourteenth aspect, a communication device is provided. The device includes a communication interface and a processor. The processor is configured to execute instructions, to control the communication interface to receive a signal, and control the communication interface to send a signal. When the processor executes the instructions, the processor is enabled to perform the method according to any one of the first aspect to the thirteenth aspect or the possible implementations of the first aspect to the thirteenth aspect.

In a possible implementation, the communication device further includes a memory. The memory is configured to store the instructions.

In a possible implementation, there are one or more processors, and there are one or more memories.

In a possible implementation, the memory may be integrated with the processor, or the memory and the processor are disposed separately.

According to a fifteenth aspect, a communication system is provided. The system includes a first network device and a second network device. The first network device is configured to perform the method according to any one of the first aspect to the third aspect or the possible implementations of the first aspect to the third aspect, and the second network device is configured to perform the method according to any one of the fourth aspect to the sixth aspect or the possible implementations of the fourth aspect to the sixth aspect.

According to a sixteenth aspect, a computer program (product) is provided, where the computer program (product) includes computer program code. When the computer program code is run by a computer, the computer is enabled to perform the methods in the foregoing aspects.

According to a seventeenth aspect, a computer-readable storage medium is provided. The computer-readable storage medium stores a program or instructions. When the program or the instructions are run on a computer, the methods in the foregoing aspects are performed.

According to an eighteenth aspect, a chip is provided. The chip includes a processor, configured to invoke and run instructions stored in a memory, so that a communication device in which the chip is installed performs the methods in the foregoing aspects.

According to a nineteenth aspect, a chip is provided, and includes an input interface, an output interface, a processor, and a memory. The input interface, the output interface, the processor, and the memory are connected through an internal connection channel. The processor is configured to execute code in the memory. When the code is executed, the processor is configured to perform the methods in the foregoing aspects.

DETAILED DESCRIPTION OF ILLUSTRATIVE EMBODIMENTS

Figure 1:
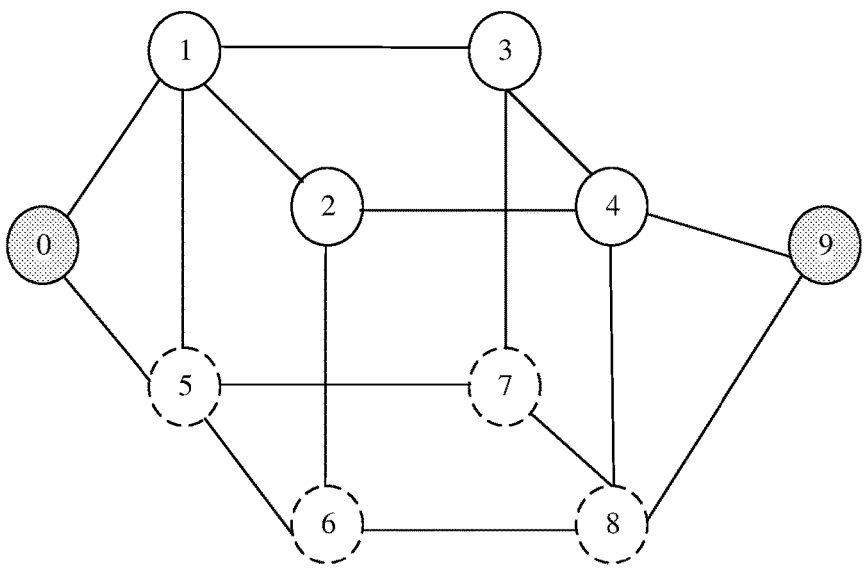
FIG. 1 is a schematic diagram of a network slice according to this application.

To enable persons skilled in the art to better understand the solutions in the present invention, the following describes embodiments of the present invention in more detail with reference to accompanying drawings and implementations.

Segment routing (SR) is a protocol designed based on an idea of source routing to forward data packets in a network. The SR divides a network path into segments and allocates segment identifiers (SIDs) to the segments and network nodes. An SID list also referred to as a label stack in SR-MPLS) may be obtained by sorting the SIDs in order. The SID list may indicate a forwarding path. With an SR technology, a node and a path through which a data packet carrying the SID list passes may be specified, to meet a traffic optimization requirement. To make an analogy, the data packet may be compared to luggage, and the SR may be compared to attaching a label to the luggage. If the luggage needs to be sent from a region A to a region D through a region B and a region C, a label indicating to "go to the region B first, then to the region C, and finally to the region D" may be attached to the luggage in the origin region A. In this way, the label on the luggage simply needs to be identified in each region, and the luggage may be forwarded from one region to another region based on the label of the luggage. In the SR technology, a headend adds a label to the data packet, and an intermediate node may forward the data packet to a next node based on the label until the data packet arrives at a destination node. For example, <SID 1, SID 2, SID 3> is inserted into a packet header of a data packet, and the data packet is first forwarded to a node corresponding to the SID 1, then forwarded to a node corresponding to the SID 2, and then forwarded to a node corresponding to the SID 3. SR-MPLS is short for segment routing multi-protocol label switching.

Internet protocol version 6 (IPv6)—based segment routing (SRv6) is to use the SR technology on an IPv6 network. An IPv6 address (128 bits) is used as a representation of an SID. When forwarding a data packet, a network device supporting SRv6 queries a local segment identifier table (local SID table) based on a destination address (DA) in the data packet. When a longest match is found between the destination address of the data packet and any SID in the local segment identifier table, the network device performs, according to a policy related to the SID in the local segment identifier table, an operation corresponding to the policy. For example, the network device may forward the data packet through an outbound interface corresponding to the SID. If no longest match is found between the destination address of the data packet and any SID in the local segment identifier table, the network device queries an IPv6 forwarding table, and performs longest-match forwarding based on the IPv6 forwarding table.

Segment routing header (SRH): An IPv6 packet includes an IPv6 standard header, an extension header (o, ..., n), and a payload Payload. To implement SRv6 based on an IPv6 forwarding plane, an IPv6 extension header is added, which is referred to as an SRH extension header. The extension header specifies an IPv6 explicit path and stores an IPv6 segment list. The headend adds an SRH extension header to the IPv6 packet, so that an intermediate node may forward the packet based on path information included in the SRH extension header. Specifically, there are two pieces of key information in the SRH. One is a segment list (Segment List) in a form of an IPv6 address, which is similar to label stack information in a multiprotocol label switching (MPLS) network. The segment list including one or more sequentially arranged segment identifiers (SID) indicates an explicit path in the SR. The other is a segment left (SL), where the SL is a pointer and indicates a current segment identifier.

A segment identifier list (SID List) includes a list of segment identifiers. After receiving a data packet, a headend in a segment routing network inserts one SID list into the data packet to explicitly indicate a forwarding path.

On an SRv6 network, a value of a DA field in an IPv6 packet constantly changes. The value of the DA field is determined by both the SL and the segment list. When the pointer SL points to a to-be-processed segment, for example, a segment list [2], an IPv6 address of the segment list [2] needs to be copied to the DA field.

On a forwarding plane, if a node supports the SR, and a segment identifier of the node is in a destination address of the IPv6 packet, after receiving the packet, the node may decrease the SL by 1, offset the pointer to a new segment, copy a segment identifier (that is, in the IPv6 address format) corresponding to the SL after the SL is decreased by 1 to the DA field, and then forward the packet to a next node. Usually, when the SL field decreases to 0, the node may pop up an SRH packet header, and then perform next processing on the packet. If a node does not support the SR, the node does not need to process SRH information in the IPv6 packet. Instead, the node searches an IPv6 routing table based on an IPv6 destination address field, and normally forwards the IPv6 packet.

An SR policy is a traffic engineering mechanism for the SR. Usually, an SR policy includes a headend, a color, a destination identifier, and a segment identifier list indicating a forwarding path. The headend identifies a headend that executes the SR policy. The color is for associating the SR with a service attribute such as a low delay and a high bandwidth, to summarize a service capability of the SR policy. The endpoint identifies a destination address of the SR policy. Usually, one SR policy is determined by using (headend, color, endpoint). For a same headend, one policy may alternatively be determined by using (color, endpoint). The SR policy may include one or more segment identifier lists, to implement functions such as load balancing and multipath backup. When forwarding a packet, the headend may determine, according to the SR policy, a segment identifier list corresponding to the packet, to determine a forwarding path for forwarding the packet, and encapsulate the segment identifier list into the packet to display or disperse an indication path.

A service requirement is a requirement of a service on network quality, where the network quality may include one or more of the following: a delay range, a bandwidth range, a packet loss rate range, a path/node that is specified to pass through, a path/node that is specified not to pass through, and the like. The foregoing range may be a specific value range, or the range may mean that an indicator indicating good or optimal in a network. For example, the delay range may be less than or equal to a specific delay value, for example, 20 milliseconds, or the delay range is a low delay. The bandwidth range may be greater than or equal to a specific bandwidth value, for example, 2G, or the bandwidth range is a large bandwidth. By providing a corresponding network slice, a corresponding forwarding tunnel, or the like, a network that transmits a service packet may meet the network quality required by the service.

A segment identifier (SID) may represent a node or a link. In SRv6, the SID is represented as a 128-bit value. In SR-MPLS, the SID is represented as a label value. An SRv6 segment identifier may include a function part, and the function part indicates that a network device corresponding to the segment identifier needs to perform a corresponding function and action.

An intent segment identifier (IntentSID) is a special SID representing service quality assurance, which may also be referred to as an intent SID, and may indicate a network quality requirement of a target service on a network. The network quality requirement may be one or more of a delay, a bandwidth, a specific path, and the like. When a large network includes a plurality of subnets, to express a same network quality requirement, a unified intent SID may be allocated to the plurality of subnets, or different intent SIDs may be allocated to different subnets, or an independent intent SID may be allocated to a device. When a same intent SID is allocated to the subnets, the intent SID is not for guiding routing in a network domain in which the intent SID functions, and is only for determining path indication information. When an independent intent SID is allocated to a device, the intent SID can also guide routing in a network in which the device resides. In an example, the intent SID may have the following function: A device in the network may determine, based on the intent SID, corresponding path indication information for a packet corresponding to the target service. The path indication information may be one or more of the following: a network slice identifier or a segment identifier list. The device in the network may determine the corresponding path indication information based on only the intent SID, or may determine the corresponding path indication information based on the intent SID and another identifier together. An intent identifier is an identifier representing service quality assurance, which may indicate a network quality requirement of a target service on a network. The network quality requirement may be one or more of a delay, a bandwidth, a specific path, and the like. When a large network includes a plurality of subnets, the plurality of subnets may use a same intent ID to express a same network quality requirement, or use a same intent ID to correspond to different network quality requirements in different subnets. Compared with the intent SID, the intent identifier is not a segment identifier.

A network slice segment identifier (AlgoSID) is a special SID representing a network slice, may also be referred to as a network slice SID, may be an instance of the intent SID, and may indicate a network slice on a network device in a network or indicate a same network slice on a plurality of network devices in a network. Consistent with the intent SID, in the former case, the AlgoSID may be further for guiding routing, and in the latter case, the AlgoSID is not for guide routing in a network domain in which the AlgoSID functions, but is only for determining a network slice identifier. The network slice SID may have the following function: A device in the network may determine a corresponding network slice for a packet based on the network slice SID. When the network slice SID is only an identifier of one device, the network slice SID further has a function of indicating a route to the network device.

Network slicing: The network slicing technology may also be understood as a virtual network technology. The network slicing technology may be a flexible algorithm (Flex-Algo) network slicing technology or a forwarding plane slicing technology, or may be a network slicing technology in another form. The network slice may be represented by using a Flex-Algo identifier or a slice identifier (SliceID).

(1) Flex-Algo Principle

In a Flex-Algo scenario, the Flex-Algo algorithm is for planning a network into a plurality of planes to form a plurality of topologies, and each topology is configured with a special Flex-Algo algorithm. An ID value of the Flex-Algo algorithm ranges from 128 to 255. A default Flex-Algo 0 algorithm topology exists in the network.

One network node or some links of the network node may be deployed in one or more Flex-Algo algorithms. FIG. 1 is an example of a network slice. This example is an example of forming a slice topology by using the Flex-Algo. The network includes a network node, that is, a network device 0 to a network device 9. At least three network slices corresponding to three Flex-Algos may be planned in the network. Each Flex-Algo algorithm supports a series of path computation factors. For example:

A path computation factor of Flex-Algo 0 may be defined as minimum costs (cost), and this Flex-Algo may include all nodes.

A path computation factor of Flex-Algo 128 may be defined as a minimum delay, and includes the network nodes 1 to 4 and the network nodes 0 and 9 shown by solid lines in FIG. 1.

A path computation factor of Flex-Algo 129 may be defined as a minimum traffic engineering-metric (TE-Metric), and includes the network nodes 5 to 8 and the network nodes 0 and 9 shown by dashed lines in FIG. 1.

A device in the network may flexibly select an Algo algorithm based on a service requirement or a network deployment requirement. For example, after slice calculation is performed on the network based on a metric, a delay, a TE metric, or the like, a schematic diagram of a network slice shown in FIG. 2 may be obtained.

(2) Slice ID Slicing Principle

A global network slice identifier SliceID is introduced to enable a forwarding plane SliceID in a conventional network control plane virtual routing and forwarding (VRF) instance. A forwarding plane packet carries a SliceID. Hop-by-hop nodes that transmit the packet identify the SliceID in the packet and restrict traffic forwarding in specific reserved resources, ensuring SLA of a slice service.

In SliceID-based slice deployment, for different services, such as mobile services and private line services, which are carried by a network and need to reserve network forwarding resources, an overall pre-fragmentation mode may be used. To be specific, a flexible Ethernet (Flexible Ethernet, FlexE)/channelized sub-interface is used to guarantee and configure resources for all basic network ports based on specific bandwidth requirements (such as a convergence ratio and a port percentage) to generate a slice network covering the entire network. A specific bandwidth is reserved for a port corresponding to each slice.

Networks that are sliced based on SliceIDs support flexible network slicing virtual private network (VPN) bearer solutions. One network slice can exclusively use one VRF instance, or a plurality of network slices can share one VRF instance. Different differentiated services code points (differentiated services code points, DSCPs) are used for introducing traffic into a plurality of network slices.

Figure 2:
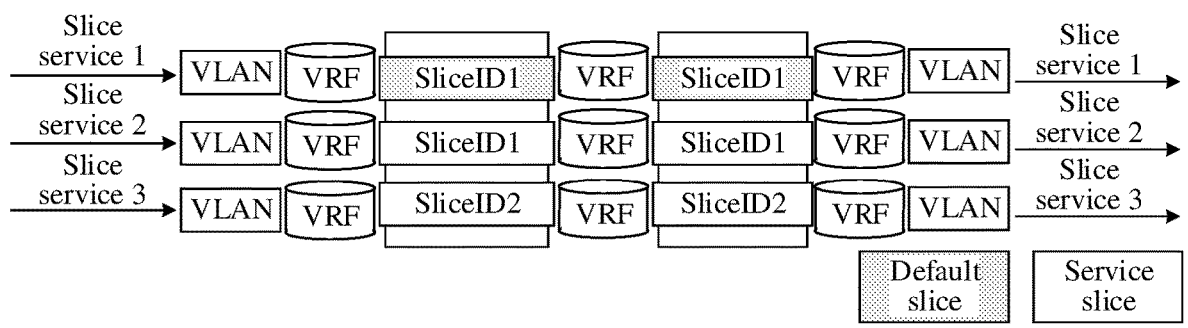
FIG. 2 is a schematic diagram of a network slice according to this application.

FIG. 2 is a schematic diagram of a network in which network slicing is performed by using a SliceID. The network includes three slices: SliceID1, SliceID2, and SliceID3. The three network slices respectively serve three slice services: a slice service 1, a slice service 2, and a slice service 3. The services correspond to three different virtual local area networks (VLANs)/DSCPs that access different logical interfaces on a transport network. Each logical interface is bound to one VRF instance.

A globally unique SliceID is planned for each network slice on a network side. After a packet of a service arrives at a network, a public network side device occupies, through mapping using a SliceID, a reserved resource specific to a network slice on a forwarding plane to meet a service level agreement (SLA) requirement of each slice service. An existing transport network of a provider is also referred to as a default slice. Forwarding resources on each physical interface may be allocated to the default slice and each service slice. All network slices share layer 3 attributes of the physical interface, including IPv6 addresses/link costs on a physical main interface, layer 3 neighbors of the physical interface, a link delay measured based on the physical main interface, and an adjacency SID label allocated based on the physical main interface. "Resource reservation" sub-interfaces of each network slice occupy reserved resources on the physical main interface, and SliceIDs are configured for these "resource reservation" sub-interfaces.

The default slice is a physical transport network before slicing, and is for carrying the basic interior gateway protocol (IGP)/border gateway protocol (BGP). Services without slice specified are carried in the default slice. The default slice can also be used as a redundancy slice for service slices.

The service slice is a slice created based on service SLA requirements. Different service slices can be logically or physically isolated. For example, each VPN instance exclusively uses a slice or a plurality of VPNs share one slice (DSCP-mapped slice). On an IPv6 network, SliceIDs are used to identify slices. A control plane maps network slice identifiers SliceIDs to "reserved resources" of the forwarding plane. Services enter different network slices based on service identifiers on a user access side.

An IP packet header may be classified into a basic header or an extension header, that is, the packet header may include the basic header, and may further include the extension header, where the basic header may also be referred to as a standard header. In an example, the IP packet header is an IPv6 packet header, and the IPv6 packet header may include an IPv6 basic header and an IPv6 extension header. The IPv6 extension header may include one or more of a destination options header, a hop-by-hop (hop-by-hop) options header, HBH) options header, and an SRH.

The foregoing briefly describes related technologies in embodiments of this application. The following describes, with reference to the network scenario shown in FIG. 3, technical solutions provided in this application. The network scenario includes a core network (core) and a metropolitan area network (metro) 1, and optionally, further includes a metropolitan area network (metro) 2, or more metropolitan area networks. The metropolitan area network 1 includes an access (ACC) device ACC1, an aggregation (AGG) device AGG1, and a metro core node (MC) device MC1. The core network includes PE1, PE2, PE3, PE4, and provider (P) devices: P1, P2, P3, and P4. The metropolitan area network 2 includes network devices such as ACC2, AGG2, and MC2. PE1 and PE2 are connected to an MC device in a metropolitan area network. For example, PE1 is connected to MC1. PE3 and PE4 are connected to an MCdevice in the metropolitan area network 2. For example, PE3 is connected to MC2. In this network scenario, more networks may alternatively be included, for example, a private network of an enterprise customer, more metropolitan area networks, or other core networks. The foregoing uses the ACC device, the AGG device, and the MC device as an example. When being used in another scenario, for example, a wireless network access scenario, the ACC device may also be referred to as a cell side gateway (CSG) device, the AGG device may also be referred to as an aggregation side gateway (ASG) device, and the MC device may also be referred to as a radio service side gateway (RSG) device.

Figure 3:
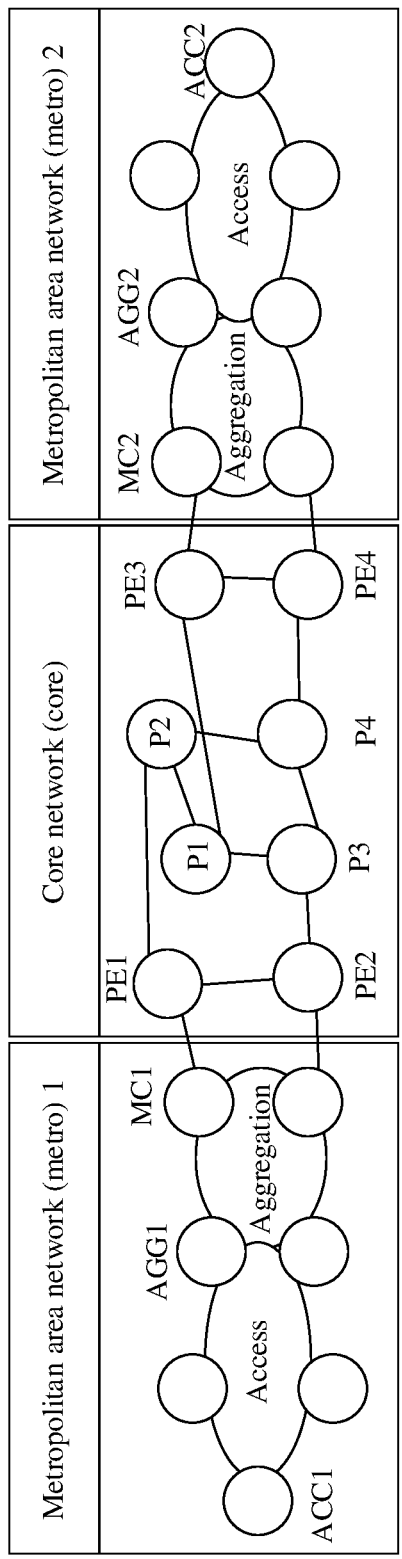
FIG. 3 is a schematic diagram of a network scenario according to this application.

In the network shown in FIG. 3, to provide a corresponding SLA for a service, an end-to-end (E2E) SRv6 policy usually needs to be established or the foregoing network slicing technology is usually used, to provide a forwarding path with a deterministic service quality requirement such as a delay requirement and a bandwidth requirement for the service. Especially for private line services with high SLA requirements, forward and reverse E2E tunnels need to be created for each network tenant to ensure service quality of the tenant. To protect tunnels and services, matching backup tunnels need to be created. A total of 20 to 30 round-trip tunnels, protection tunnels, and local tunnels can be created for a service. This greatly challenges a tunnel bearing capability of a network device and tunnel management and maintenance capabilities of a controller. Especially in a service scenario of connecting to a cloud through a private line, a service packet is usually transmitted through a large network, where the network may include a plurality of small networks, such as a core network or a metropolitan area network. Because an E2E tunnel may cross a plurality of autonomous systems (ASs) or interior gateway protocol (IGP) domains, a quantity of nodes that the E2E tunnel passes through is excessively large, and end-to-end tunnel configuration is extremely complex. The configuration is more complex especially when the service needs to be transmitted through a plurality of networks and the plurality of networks use different network technologies to serve the service, for example, when the core network uses a network slicing technology to ensure network quality and the metropolitan area network uses an SRv6 technology to ensure network quality. In an example, the core network and the metropolitan area network 1 herein belong to different IGP domains, or belong to different ASs. In a scenario, a cloud provider edge (provider edge, PE) device will become a tunnel PE aggregation node of private line services of metropolitan area networks, and massive tunnels need to be created. On a large-scale network, massive tunnels are created on the entire network not only for site-to-cloud private lines but also for B2B private lines. The controller needs to manage, control, and maintain these massive tunnels. With service development, more tunnels are created on network devices, and more tunnels are managed and controlled by the control device.

This application provides a plurality of technical solutions, to resolve a problem that an excessive quantity of tunnels are configured in the foregoing network to ensure service quality.

Figure 4:
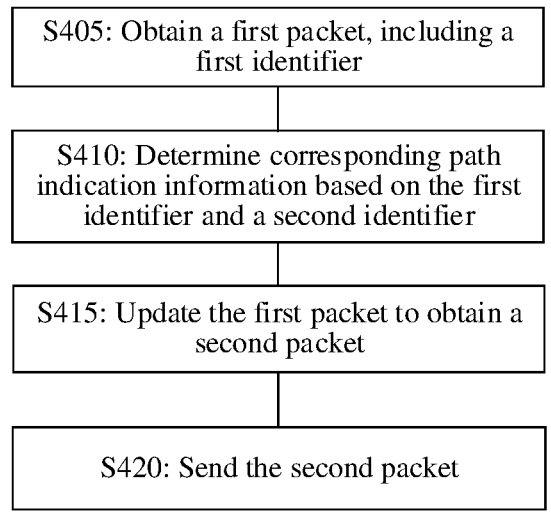
FIG. 4 is a schematic flowchart of a packet sending method according to this application.

FIG. 4 is a schematic flowchart of a packet sending method according to this application. The method includes the following steps.

S405: A first network device obtains a first packet, where an IP extension header of the packet includes a first identifier.

The first identifier indicates a service requirement corresponding to the first packet, and the first identifier may be the intent SID or the intent identifier described above.

A manner in which the first network device obtains the first packet includes the following two cases:

Case 1: The first network device receives a packet sent by a second network device, where the packet is the first packet.

Case 2: After receiving a packet sent by a second network device, the first network device updates the packet to obtain the first packet. For example, when the packet includes a segment identifier list, the first network device may update a DA of the packet based on the segment identifier list, and in this case, the first packet obtained by the first network device is a packet with an updated DA.

The second network device and the first network device may be located in a same network, or may be located in different networks. When the method is applied to the network shown in FIG. 3, the second network device may be, for example, the ACC1 device or the MC1 device in the metropolitan area network 1 in the network shown in FIG. 3, and the first network device may be, for example, a device such as PE1 or PE2 in the core network in the network shown in FIG. 3, or a device such as MC2 in the metropolitan area network 2. For another example, the P2 device in the core network in the network shown in FIG. 3 may be the second network device, and PE1 may be the first network device.

In an example, the first identifier may be a segment identifier, for example, an intent segment identifier. When the first identifier is the segment identifier, an SRH of the first packet includes the first identifier. Optionally, the SRH may further include a second identifier. In another example, the first identifier may be an intent identifier. In this case, an HBH of the packet may include the first identifier.

To be specific, the packet sent by the second network device to the first network device includes the first identifier, and the identifier corresponds to the service requirement. A manner in which the packet sent by the second network device to the first network device includes the first identifier includes but is not limited to the following several cases:

Case A: After obtaining the first identifier sent by a control device, the second network device encapsulates the first identifier into the packet.

The control device may calculate an end-to-end forwarding path based on a network topology and a requirement of a service, for example, from the metropolitan area network 1 to the core network and to the metropolitan area network 2 shown in FIG. 3. The forwarding path may correspond to a segment identifier list, that is, the segment identifier list indicates the forwarding path. The segment identifier list may include at least one identifier, and the at least one identifier includes the first identifier. For example, if ensuring quality of a forwarding path of the core network needs to be focused on for the service, the control device may send, to the second network device, only a first identifier that can be applied to the core network. For example, the first identifier may be a segment identifier of PE1. In this case, the forwarding path passes through PE1. In an example, the segment identifier list obtained by the second network device may include only the first identifier, for example, an intent SID: IntentSID1, where the SID indicates that a forwarding path of a service A is finally determined in the core network based on a service requirement corresponding to IntentSID1. In another example, the segment identifier list may include IntentSID2, IntentSID1, and IntentSID3, and the first identifier may be, for example, IntentSID1, IntentSID2, or IntentSID3. IntentSID1 may be an intent SID of ACC1 or intent SIDs of at least two devices in the metropolitan area network 1, and the at least two devices may be edge devices in the metropolitan area network 1, such as ACC1 and MC1. IntentSID2 may be an intent SID of PE1 or intent SIDs of at least two devices in the core network, and the at least two devices may be edge devices in the core network, such as PE1, PE2, PE3 and PE4. IntentSID3 may be an intent SID of ACC2 or intent SIDs of at least two devices in the metropolitan area network 2, and the at least two devices may be edge devices in the metropolitan area network 2, such as ACC2 and MC2. That the intent SID is the intent SIDs of the at least two devices described herein and subsequently means that at least two network devices included in a first network may determine, based on the first identifier, path indication information corresponding to the packet.

Alternatively, the control device may send the intent identifier to the second network device based on planning of each network. The intent identifier may have a different meaning in each network, or may have a consistent meaning in a plurality of networks. For example, the control device may send an intent identifier to ACC1. The intent identifier may be, for example, IntentID1. IntentID1 may simultaneously act on the core network, the metropolitan area network 1, and the like shown in FIG. 3. IntentID1 may indicate that a service requirement is, for example, a low delay, in both the core network and the metropolitan area network. Alternatively, IntentID1 indicates that a service requirement of a target service on the core network is a low delay, and service requirements of the target service on the metropolitan area network are a high bandwidth and a low delay.

In the foregoing descriptions, the control device may send the calculated segment identifier list by using a link state protocol packet or a path computation element communication protocol packet.

Case B: The second network device encapsulates the first identifier into a received packet based on the obtained configured first identifier.

The second network device may alternatively obtain the first identifier configured by management personnel in an unlimited manner such as by using a management device or a management interface. Then, the first identifier is encapsulated into the received packet, and the packet is sent to the first network device.

Case C: The second network device receives a packet sent by an upstream device of the second network device, where the packet carries the first identifier.

In an example, when the second network device is MC1 in FIG. 3, when the second network device receives a packet sent by ACC1, the packet already carries the first identifier.

In the foregoing descriptions, an IP extension header in the packet sent by the second network device to the first network device includes the first identifier. The IP extension header may be an HBH or a destination options header.

In an example, a destination address of the packet further includes the second identifier.

S410: The first network device determines, based on the first identifier and the second identifier, path indication information corresponding to the first packet.

Corresponding to the foregoing two cases in which the first network device obtains the first packet, the destination address (DA) in the packet received by the first network device may be the second identifier, or after the second network device updates the DA of the packet to obtain the first packet, the DA of the first packet is the second identifier. That is, the DA of the first packet includes the second identifier.

In an example, the second identifier is a segment identifier, for example, a virtual private network (VPN) SID, an intent segment identifier, or another segment identifier, and the second identifier is further carried in the SRH of the first packet. In another example, the second identifier is a destination address in an IPv6 packet header, and is not carried in the SRH of the first packet. The second identifier may be used by the first network device to perform routing addressing, determine a forwarding policy, and the like.

The path indication information includes one or more of the following: a network slice identifier, a segment identifier list, best-effort (BE) forwarding, and the like. The network slice identifier may identify a network slice for forwarding the first packet. The network slice identifier may be for identifying the slice by only the first network device, or may be for identifying the slice by a plurality of devices in the first network in which the first network device is located. The network slice identifier may be one or two of a flexible slice identifier or a SliceID. The segment identifier list may indicate a forwarding tunnel for forwarding the first packet, and may include one or more segment identifiers. The segment identifier in the segment identifier list may include one or more of a network slice segment identifier, an intent segment identifier, or another segment identifier.

The first network device determines the corresponding path indication information based on the first identifier and the second identifier in, but not limited to, the following several manners:

Manner 1: The first network device determines, based on the second identifier, a forwarding policy corresponding to the first packet, where the forwarding policy includes a first correspondence between the first identifier and the path indication information.

In this case, the first network device may determine the path indication information based on the first identifier and the first correspondence.

In an example, the forwarding policy may include only one correspondence. In another example, the forwarding policy may include a plurality of correspondences. That is, the forwarding policy may be a single policy, or may be a policy group.

In an example, the correspondence may be shown in Table 1. The table includes the second identifier, the first identifier, and the path indication information. Identification information included in the first packet is as follows: The second identifier is VPNSID1 indicating a sending direction of the first packet, and the first identifier is an intent SID of the packet, for example, IntentSID1. It can be learned, based on the correspondence shown in Table 1, that the first packet may determine that the path indication information corresponding to the first packet is 129. In this example, 129 is a flexible algorithm identifier.

TABLE 1

| Second identifier | First identifier | Path indication information |
|---|---|---|
| VPNSID1 | IntentSID1 | 129 |
| VPNSID1 | IntentSID2 | 128 |

In an example, the correspondence may be shown in Table 2. The first network device may determine, based on the second identifier, a forwarding policy shown in Table 2, and then determine, based on IntentSID1, that path indication information corresponding to IntentSID1 is 129.

TABLE 2

| First identifier | Path indication information |
|---|---|
| IntentSID1 | 129 |
| IntentSID2 | 128 |

In another example, Table 3 shows an example of a case in which the forwarding policy is a policy group. The forwarding policy may be a policy group 10 shown below.

TABLE 3

| First identifier | Path indication information |
|---|---|
| IntentSID1 | policy 1 (low delay + high bandwidth) |
| IntentSID2 | policy 2 (low delay + high reliability) + SliceID 1 |
| IntentSID8 | SliceID 1 |

The policy group includes a correspondence between the first identifier and the path indication information, that is, includes a corresponding policy of the first identifier and the path indication information. The first network device may determine, by using the second identifier such as VPNSID1, the policy group 10 shown in Table 3. The policy group 10 includes a plurality of correspondences, that is, a plurality of detailed policies. IntentSID1 corresponds to the policy 1. Service requirements of IntentSID1 are a low delay and a high bandwidth. The policy 1 is an SR policy or a segment identifier list. When the policy 1 is an SR policy, the first network device may determine a corresponding segment identifier list. A forwarding path indicated by the segment identifier list can meet transmission requirements of a low delay and a high bandwidth. Similarly, path indication information corresponding to IntentSID2 includes the segment identifier list and SliceID1 provided by the policy 2. It indicates that when the intent SID in the packet is IntentSID2, the packet is sent, based on a network slice indicated by the SliceID, on the forwarding path corresponding to the segment identifier list indicated by the policy 2. A first identifier in the third correspondence is IntentSID8, and is an intent identifier. Path indication information corresponding to IntentSID8 is SliceID1, indicating that when the first identifier in the packet is IntentSID8, the first packet may be sent based on a network slice indicated by SliceID1.

Manner 2: The first network device determines, based on the first identifier, a third identifier corresponding to the first identifier, and determines, based on the second identifier, a forwarding policy corresponding to the first packet, where the forwarding policy includes a first correspondence between the third identifier and the path indication information.

In this case, the first network device may determine the path indication information based on the third identifier and the second correspondence.

In this manner, the first network device further determines, based on the first identifier, the third identifier corresponding to the first identifier. In an example, the first network device further stores a correspondence between the first identifier and the third identifier, as shown in Table 4.

TABLE 4

| First identifier | Third identifier |
|---|---|
| IntentSID1 | IntentID2 |
| IntentSID2 | IntentID3 |

In this case, after obtaining the third identifier based on the first identifier, the first network device may determine, based on any manner in the plurality of examples provided in Manner 1, the path indication information corresponding to the third identifier. Details are not described herein again in this application. Adding the third identifier can enable the control device to implement network-wide service orchestration by using a same intent SID. However, different third identifiers are configured on each network or each device, so that corresponding path indication information can be obtained by using the correspondence between the first identifier and the third identifier, thereby facilitating hierarchical network management.

S415: The first network device updates the first packet based on the path indication information to obtain a second packet.

After determining the path indication information corresponding to the first packet, the first network device may update the first packet to obtain the second packet. A manner in which the first network device updates the first packet to obtain the second packet includes but is not limited to the following manners:

Manner 1: After determining the path indication information, the first network device may encapsulate the path indication information into the first packet to obtain the second packet, so that a device that subsequently needs to continue to forward the packet can forward the packet based on the path indication information obtained by the first network device. In this way, tunnel information configuration in the network can be reduced.

In an example, if the path indication information is a segment identifier list, the first network device may encapsulate a new IPv6 packet header for the first packet. The IPv6 packet header includes an SRH, and the SRH includes the segment identifier list corresponding to the path indication information.

In another example, if the path indication information is a network slice identifier, the first network device may encapsulate a new IPv6 packet header for the first packet. The IPv6 packet header includes an HBH or a destination options header, and the HBH or the destination options header includes the network slice identifier corresponding to the path indication information.

In another example, if the path indication information is a flexible algorithm identifier and a network slice identifier, the first network device may encapsulate a new IPv6 packet header for the first packet. The IPv6 packet header includes at least one HBH, and the at least one HBH includes the flexible algorithm identifier and the network slice identifier. In other words, the flexible algorithm identifier and the network slice identifier may be carried in a same HBH, or may be carried in different HBHs.

Manner 2: The first network device may not encapsulate the path indication information. When the path indication information is a network slice identifier or a segment identifier list, the first network device may determine, based on the path indication information, an outbound interface for sending the first packet. After determining the outbound interface of the first packet, the first network device may update the first packet based on information such as a media access control (Media Access Control, MAC) address of the outbound interface, to obtain the second packet. When the path indication information is a segment identifier list, the segment identifier list may include only one segment identifier. When the segment identifier is an SID of the first network device, the first network device may determine, based on the SID, an outbound interface for sending the first packet.

The foregoing is only examples of updating, by the first network device, the first packet to obtain the second packet. The first network device may alternatively update the first packet in another manner, for example, updating an existing HBH header. The manner in which the first network device updates the first packet is not limited in this application.

S420: Send the second packet.

After determining the corresponding path indication information, the first network device may send the second packet based on the path indication information. As shown in Table 1, after determining that the corresponding path indication information is the flexible algorithm identifier 129, the first network device may send the second packet based on the flexible algorithm identifier 129. In this process, the first network device may further determine, in combination with a destination address of the second packet and the flexible algorithm identifier, an outbound interface for sending the second packet.

Figure 5:
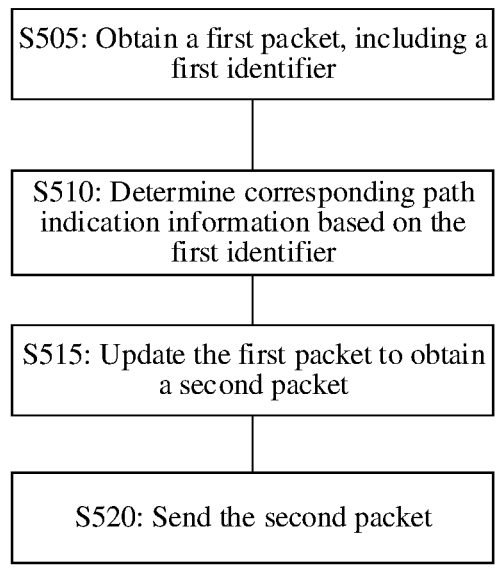
FIG. 5 is a schematic flowchart of a packet sending method according to this application.

FIG. 5 is a schematic flowchart of a packet sending method according to this application. The method includes the following steps.

S505: A first network device obtains a first packet, where the first packet includes a first identifier.

The solution of the method is described in detail below in two cases.

Case A: An IP packet header of the first packet includes the first identifier.

The IP packet header of the first packet may be the basic header or the extension header described above. This is not limited herein. The first identifier may be the intent SID, the intent identifier, or the network slice segment identifier described above. When the first identifier is the network slice segment identifier, for example, a flexible algorithm segment identifier (AlgoSID), the network slice segment identifier may correspond to one flexible algorithm identifier or SliceID on PE1, and the flexible algorithm identifier or the SliceID corresponds to one network slice on PE1. Alternatively, the first identifier may correspond to a network slice in a core network, that is, the AlgoSID may be identifiers of at least two network devices in the network, and the at least two devices may be edge devices, for example, PE1, PE2, PE3, and PE4, or more devices, in the core network. That the AlgoSID is the identifiers of the at least two devices described herein and subsequently means that at least two network devices included in a first network may determine, based on the first identifier, path indication information corresponding to the first packet.

Case B: An HBH or a destination options header of the first packet includes the first identifier, and the first identifier is an intent ID.

The first identifier indicates a service requirement corresponding to the first packet.

Based on each of Case A and Case B, a manner in which the first network device obtains the first packet includes the following two cases:

Case 1: The first network device receives a packet sent by a second network device, where the packet is the first packet.

Case 2: After receiving a packet sent by a second network device, the first network device updates the packet, and in this case, an updated packet is the first packet obtained by the first network device. For example, when the packet includes a segment identifier list, the first network device may update a DA of the packet based on the segment identifier list, and in this case, the first packet obtained by the first network device is a packet with an updated DA.

The second network device and the first network device may be located in a same network, or may be located in different networks. When the method is applied to the network shown in FIG. 3, the second network device may be, for example, the ACC1 device or the MC1 device in the metropolitan area network 1 in the network shown in FIG. 3, and the first network device may be, for example, a device such as PE1 or PE2 in the core network in the network shown in FIG. 3, or a device such as MC2 in the metropolitan area network 2. For another example, the P2 device in the core network in the network shown in FIG. 3 may be the second network device, and PE1 may be the first network device.

In an example of Case A, the first identifier may be a segment identifier, for example, an intent segment identifier or a network slice segment identifier. When the first identifier is the segment identifier, an SRH of the first packet includes the first identifier. In another example of Case A, the first identifier may be an intent ID. When the first identifier is the intent ID, the HBH or the destination options header of the first packet may include the first identifier.

For Case A, the first identifier may be carried in the IP packet header of the packet sent by the second network device to the first network device. For Case B, the first identifier may be carried in the HBH or the destination options header of the packet sent by the second network device to the first network device.

A plurality of cases in which the IP packet header and the packet sent by the second network device to the first network device include the first identifier are similar to S405 and related content in the method embodiment shown in FIG. 4. Details are not described herein again in this application.

S510: The first network device determines the corresponding path indication information based on the first identifier.

Case A:

The path indication information is a network slice identifier. The network slice identifier may identify a network slice for forwarding the first packet. The network slice identifier may be for identifying the slice by only the first network device, or may be for identifying the slice by a plurality of devices in the first network in which the first network device is located. The network slice identifier may be one or two of a flexible slice identifier or a SliceID.

The first network device determines the corresponding path indication information based on the first identifier in, but not limited to, the following several manners:

Manner 1: If the first network device includes a correspondence between the first identifier and the path indication information, the first network device determines the path indication information based on the correspondence between the first identifier and the path indication information.

In an example, the correspondence may be shown in Table 5. The first network device may determine, based on IntentSID1, that path indication information corresponding to IntentSID1 is 129.

TABLE 5

| First identifier | Path indication information |
|---|---|
| IntentSID1 | 129 |
| IntentSID2 | 128 |

Manner 2: The first network device determines, based on the first identifier, a third identifier corresponding to the first identifier, and determines the path indication information based on a correspondence between the third identifier and the path indication information.

In this case, the first network device may determine the path indication information based on the third identifier and the correspondence.

In this manner, the first network device further determines, based on the first identifier, the third identifier corresponding to the first identifier. In an example, the first network device further stores a correspondence between the first identifier and the third identifier, as shown in Table 6.

TABLE 6

| First identifier | Third identifier |
|---|---|
| IntentSID1 | IntentID2 |
| IntentSID2 | IntentID3 |

In this case, after obtaining the third identifier based on the first identifier, the first network device may determine, based on the manner provided in Manner 1, the path indication information corresponding to the third identifier. Details are not described herein again in this application.

Case B:

The path indication information is a segment identifier list. To be specific, the first network device may determine, based on a correspondence between an intent ID and a segment identifier list or a correspondence between an intent ID and an SR policy, a segment identifier list corresponding to the intent ID.

S515: The first network device updates the first packet to obtain a second packet.

Case A: A manner in which the first network device updates the first packet to obtain the second packet is similar to the manner in which the path indication information is the network slice identifier in S415 in the method embodiment shown in FIG. 4. Details are not described again in this application.

Case B: A manner in which the first network device updates the first packet to obtain the second packet is similar to the manner in which the path indication information is the segment identifier list in S415 in the method embodiment shown in FIG. 4. Details are not described again in this application.

S520: Send the second packet.

After determining the corresponding path indication information, the first network device may send the second packet based on the path indication information. As shown in Table 1, after determining that the corresponding path indication information is the flexible algorithm identifier 129, the first network device may send the second packet based on the flexible algorithm identifier 129. In this process, the first network device may further determine, in combination with a destination address of the second packet and the flexible algorithm identifier, an outbound interface for sending the second packet.

Figure 6:
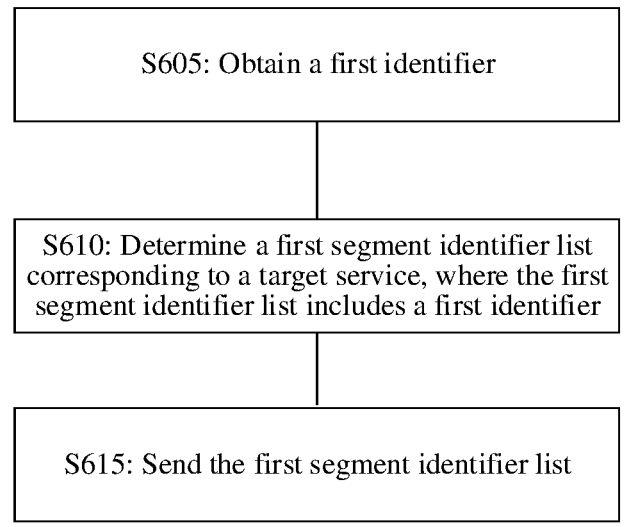
FIG. 6 is a schematic flowchart of an identifier sending method according to this application.

FIG. 6 is a schematic flowchart of an identifier sending method according to this application. A procedure of the method is applied to a control device in a network, and includes the following steps.

S605: The control device obtains a first identifier.

The control device may be a controller, a management device, an orchestrator, a router, a switch, or the like in the network. The first identifier corresponds to a service requirement. The first identifier is the first identifier in the method embodiment shown in FIG. 4 or FIG. 5, and the first identifier may be an intent segment identifier or a network slice segment identifier.

A manner in which the control device obtains the first identifier includes but is not limited to the following manners:

Manner 1: The control device generates the first identifier. For example, the control device generates an intent segment identifier based on network service planning.

Manner 2: The control device receives the first identifier sent by a network device. The control device may receive a packet that carries the first identifier and that is sent by the network device, where the packet may be a link state protocol packet or a path computation element communication protocol packet, to obtain the first identifier from the packet.

S610: The control device determines a first segment identifier list corresponding to a target service, where the first segment identifier list includes the first identifier.

The control device may determine, based on network planning or interconnection with another service system, the segment identifier list corresponding to the target service. The first segment identifier list includes the first identifier.

Optionally, the first segment identifier list further includes another segment identifier, such as a network slice segment identifier, an intent segment identifier, or a VPN SID.

The first segment identifier list determined by the control device may be a segment identifier list that indicates an end-to-end forwarding path for forwarding a target service packet, for example, a segment identifier list that indicates the end-to-end forwarding path from the metropolitan area network 1 to the core network and then to the metropolitan area network 2 in the scenario shown in FIG. 3, or may be a segment identifier list that indicates a segment path, for example, a segment identifier list that indicates only a forwarding path of the core network. In an example, the forwarding path passes through a first network device included in a first network, for example, may be sent to a device such as ACC1 or PE1. The first identifier may be for enabling the first network device to determine corresponding path indication information based on the first identifier, and the path indication information herein includes a segment identifier list and/or a second segment identifier list.

S615: The control device sends the first segment identifier list.

After determining the first segment identifier list corresponding to the target service, the control device may send the segment identifier list to one or more devices in the network. In the network scenario shown in FIG. 3, the first segment identifier list may be sent to a headend of the forwarding path, for example, may be sent to a device such as ACC1 or PE1.

The control device may send the first segment identifier list by using a link state protocol packet or a path computation element communication protocol packet.

The foregoing briefly describes the technical solutions provided in this application. The following further describes in detail application of the technical solutions provided in this application by applying the method embodiment shown in FIG. 4, FIG. 5, or FIG. 6 to the network scenario shown in FIG. 3.

Example 1: The first identifier is an intent identifier, and the first network device may be the network device PE1 shown in FIG. 3. PE1 may receive a packet sent from MC1, where the packet carries the intent identifier. The intent identifier may be updated to the packet by ACC1 after ACC1 receives the packet. In an example, an HBH of the packet carries the intent identifier.

In this case, after receiving the packet, PE1 determines, based on the intent identifier, a corresponding SliceID for identifying a network slice, and forwards the packet based on the SliceID. Optionally, PE1 may further update the packet, remove the existing HBH header of the packet, and encapsulate a new HBH header for the packet. The new HBH includes the SliceID. After receiving the packet, another device in a subnet that supports network slicing may forward the packet in the corresponding network slice based on the SliceID. For example, in a scenario in which a same locator address is planned for different Flex-Algos, a Flex-Algo ID that identifies a Flex-Algo network slice may be carried in an IPv6 extension header HBH. In a subnet that supports network slicing, packet forwarding is guided in a corresponding network slice based on the Flex-Algo ID.

Example 2: An AlgoSID is defined. A definition of the AlgoSID may be shown in Table 7.

TABLE 7

| Code type | Code name (Codename) | Behavior (Behavior) |
|---|---|---|
| AlgoSID | End.Algo | Indicates a special SID of a Flex-Algo slice. A function of the SID is to indicate a Flex-Algo network slice on a node/network device. |

Behavior of the AlgoSID is as follows:

After a network device receives an SRv6 packet, if a current active (active) SID in an SRH is an AlgoSID, that is, the network device determines that the network device can process the AlgoSID. In this case, the network device obtains a network slice ID based on a correspondence between the AlgoSID and the slice ID, and encapsulates the slice ID into an HBH of the packet to guide packet forwarding in the specified slice. In this specification, the correspondence is also referred to as a mapping relationship, and is specifically configured on PE1. The mapping relationship is shown in Table 8 below.

TABLE 8

| Algo SID | Intent ID/Flex-Algo ID |
|---|---|
| A1:1::200 | 128 |
| A1:1::201 | 129 |
| . . . | . . . |

1. When orchestrating a path, a controller orchestrates the Algo SID into an E2E tunnel SID list based on a network quality requirement of a service. ACC1 encapsulates the Algo SID into the SRH of the packet.
2. When the packet enters the subnet, the current processing SID in the SRH is the Algo SID. The device converts the Algo SID into an "intent ID" or "slice ID" based on the correspondence between the Algo SID and the network slice identifier, and encapsulates the intent ID or the Flex-Algo ID into the HBH of the packet. The device searches a corresponding Flex-Algo routing table based on the intent ID or the Flex-Algo ID, and forwards the packet corresponding to the target service by constraining the packet in the network slice.

Figure 7:
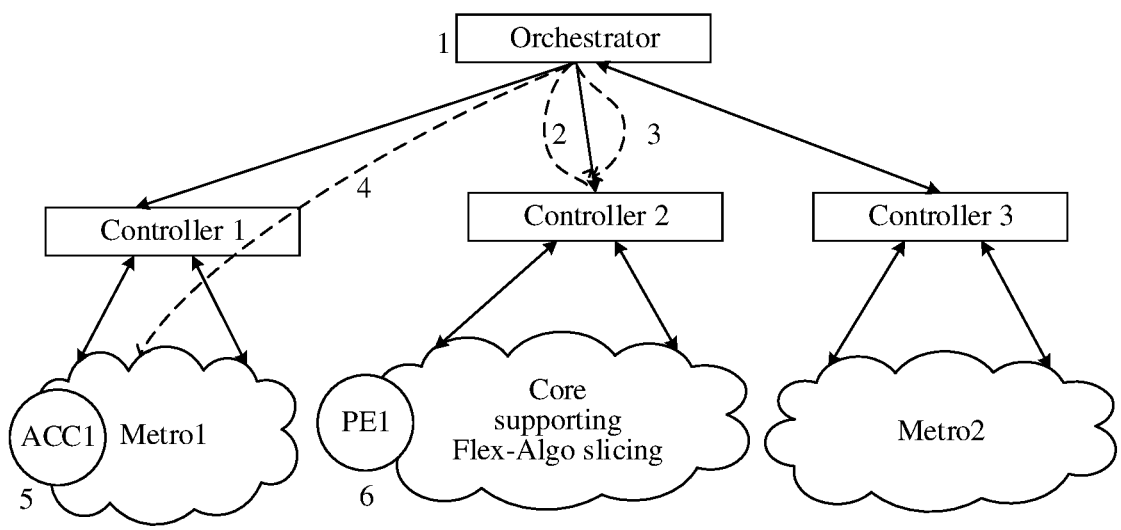
FIG. 7 is a schematic diagram showing that a control device performs a path orchestration and processing process according to this application.

In an example, a process in which the control device performs path orchestration and processing is shown in FIG. 7. Steps 1 to 6 shown in FIG. 7 are respectively shown as follows:

1. An orchestrator orchestrates a path based on a service requirement, for example, an SLA requirement.
2. The orchestrator sends, to the controller, a request for obtaining an SID corresponding to an intent. The request may carry Flex-Algo information and information about a first/last PE node of a core network.
3. The controller obtains, based on the Flex-Algo information and the information about the first/last node in the instruction of the orchestrator, a first identifier AlgoSID corresponding to a Flex-Algo on a specified first PE node, and returns the first identifier AlgoSID to the orchestrator.
4. The orchestrator orchestrates a path and delivers a path SID list to a network device ACC through the controller. The path SID list carries the AlgoSID.
5. A headend of a tunnel in the network device encapsulates an SRH with the AlgoSID. For example, ACC1 encapsulates the SRH.
6. After PE1 in the core network that supports Flex-Algo slicing receives a packet, a current SID is the AlgoSID. PE1 converts the AlgoSID into an intent ID or a Flex-Algo ID and encapsulates the ID into an HBH.

Figure 8:
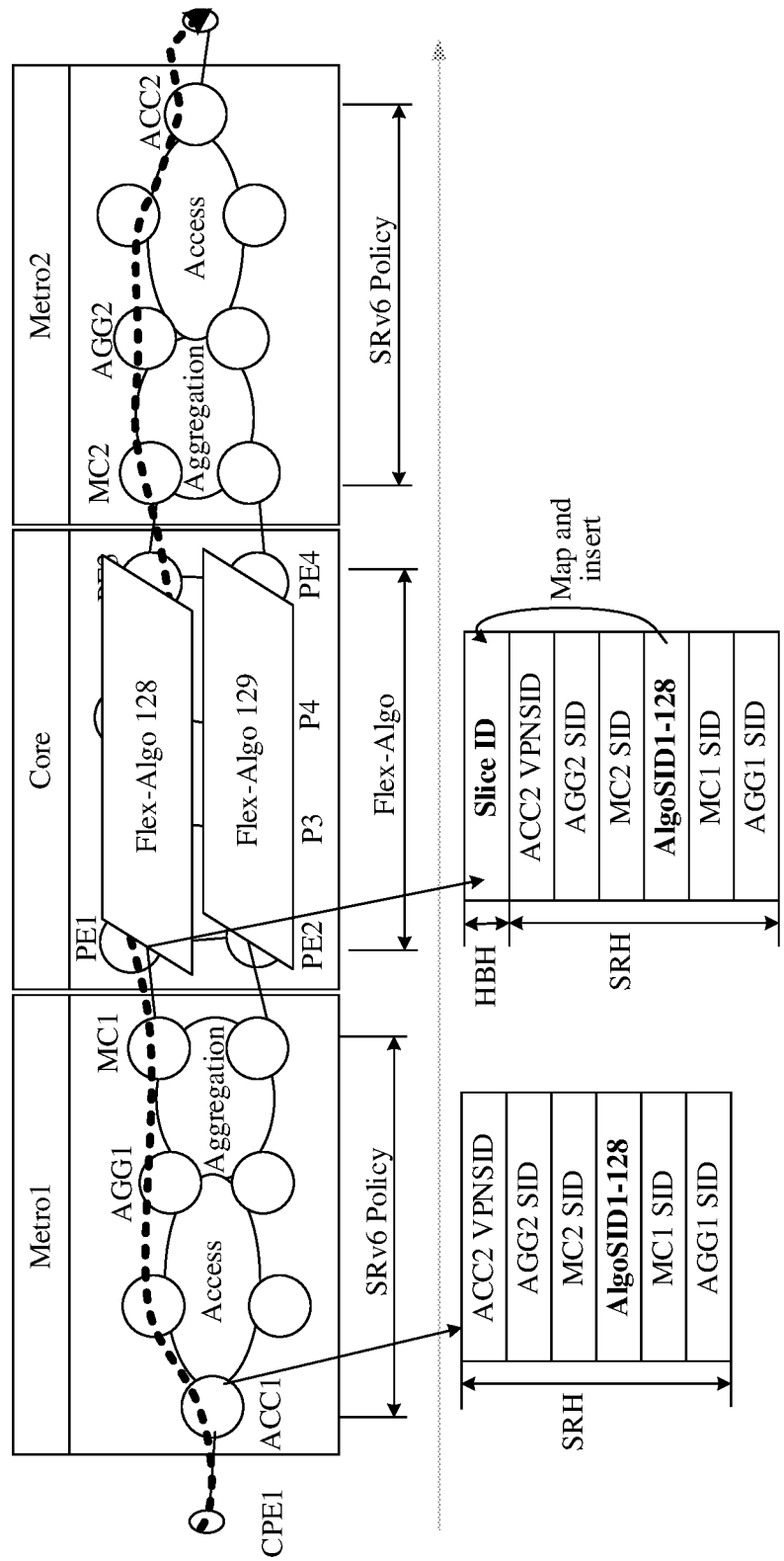
FIG. 8 is an example diagram of application of a packet sending method according to this application.

As shown in FIG. 8, when this solution is applied to the network shown in FIG. 3, Metro1 and Metro2 are networks that support an SRv6 policy, and the core network is a network that supports Flex-Algo network slicing. The orchestrator orchestrates an end-to-end forwarding tunnel based on a service requirement of the target service. As shown in FIG. 8, (AGG1 SID, MC1 SID) of a forwarding path in the Metro1 network are segment identifiers of AGG1 and MC1 respectively, indicating that the packet of the target service needs to be forwarded through AGG1 and MC1 of Metro1. (MC2 SID, AGG2 SID, ACC2 SID) of the path in the Metro2 network are segment identifiers of MC2, AGG2, and ACC2 respectively. Tunnels in Metro1 and Metro2 are SID lists in an SRv6 policy tunnel form. In the core network, a same locator address may be planned for different Flex-Algo network slices, for example, Algo SID1-128 represents Flex-Algo 128 of a PE1 node, indicates a slice, and may further be for specifying a route of a PE. The orchestrator may obtain information about a headend and a tailend that have a slicing capability in the core network, and the orchestrator may select a Flex-Algo, for example, AlgoSID1-128, of the core network for the core network based on a service intent. The orchestrator may obtain in advance a correspondence between an intent ID or an AlgoSID and a network slice identifier. In an example, the mapping relationship is shown in the following Table 9:

TABLE 9

| Intent ID/AlgoSID | Slice identifier |
|---|---|
| Intent 1 (assured bandwidth) | Flex-Algo 128 |
| Intent 2 (assured low delay) | Flex-Algo 129 |
| Intent 3 (not through an XXX link) | Flex-Algo XXX |

After obtaining the segment identifier list, the orchestrator may send the segment identifier list to ACC1. A packet forwarding process shown in FIG. 8 is as follows:
1. After receiving the packet corresponding to the target service sent by a customer premises equipment (customer-premises equipment, CPE), ACC1 of Metro1 encapsulates the obtained segment identifier list (AGG1 SID, MC1 SID, AlgoSID1-128, MC2 SID, AGG2 SID) and AGG2 VPN SID obtained based on a destination address of the packet into the packet, and then forwards the packet.
2. After the ingress PE1 of the core network receives the packet, if an active SID of the packet is AlgoSID1-128, PE1 determines, based on AlgoSID1-128, that corresponding path indication information is that a slice ID is 128, and PE1 may encapsulate the slice ID 128 into an HBH of the packet, and select the slice 128 to continue to forward the packet.
3. After receiving the packet, another device such as P1 or P2 in the core network searches, based on the slice ID 128 carried in the packet, a routing table corresponding to the Flex-Algo, to forward the packet.

Herein, a correspondence between an Algo SID and a slice ID is set on a PE node device in the core network, as shown in Table 10:

TABLE 10

| Node | AlgoSID | Flex-Algo ID |
|---|---|---|
| PE1 | AlgoSID1-128 | 128 |
| PE1 | AlgoSID1-129 | 129 |
| PE1 | AlgoSID1-130 | 130 |
| PE2 | AlgoSID2-128 | 128 |
| PE2 | AlgoSID2-129 | 129 |
| PE2 | AlgoSID2-130 | 130 |

As shown in FIG. 8, in the packet SID list, (AGG1 SID, MC1 SID) representing the path in the Metro1 network and (MC2 SID, AGG2 SID, ACC2 SID) representing the path in the Metro2 network are only for representing paths in different networks, and the paths in these networks may also be represented by binding segment identifier (binding SID, BSID). That is, the headend ACCs may also obtain a segment identifier list including the BSID. After receiving the packet, the network device transmitting the packet may expand the BSID, and then encapsulate an SRH of a local tunnel at an outer layer of the packet. Because an edge network is accessible only by local users, a quantity of users who access the network and a quantity of tunnels are much less than those of an aggregation network that is similar to the core network. Therefore, the technical solution focuses on resolving a problem of excessive tunnels in the core network. Certainly, if a metropolitan area network also supports Flex-Algo network slicing and an HBH, the foregoing technical solution may also be applied to an edge metropolitan area network, to reduce a quantity of tunnels of the edge metropolitan area network. The present invention is not limited to an application network and an application scenario. In addition, this technical solution does not require a large quantity of devices in the edge network to be upgraded to support an HBH. A device can automatically generate a new AlgoSID. An SRv6 policy can be deployed on an edge network that does not support network slicing or an HBH. A core network that supports slicing and an HBH that carries a slice ID or an intent ID can be upgraded to deploy a Flex-Algo network slice or a network slice that matches the SliceID. Therefore, this solution is more suitable for a scenario in which an edge network cannot be upgraded to support network slicing and a core network supports network slicing and an HBH that carries a slice ID or an intent ID. This scenario is a most possible problem in current network deployment.

Example 3: A dedicated SID representing a same Flex-Algo slice is uniformly allocated in an entire subnet. A core difference between this technical solution and Example 2 is as follows: The AlgoSID in Example 2 is allocated to each device in a same network, while in this example, a same AlgoSID is allocated to a same slice without distinguishing between network devices. For a network that supports network slicing, nodes are not distinguished. Each slice is allocated a unique Algo SID. For example, Algo SID-128 in the foregoing figure indicates the slice Flex-Algo 128 in the core network. This SID only indicates a slice and does not distinguish nodes. That is, the AlgoSID may be SIDs of at least two devices in the network.

For such SIDs, a special type of SID is newly defined, for example, a flexible slice anycast segment identifier (AlgoAnycastSID), which may be a special type of the AlgoSID. An example of a function definition of this type of SID is shown in Table 11 below.

TABLE 11

| Code type | Codename | Behavior |
|---|---|---|
| AlgoAnycastSID | End.flexible slice anycast (End.AnycastAlgo) | Indicates a special SID of a Flex-Algo slice. A function of the SID is to indicate a Flex-Algo network slice on any node. |

Behavior of the AlgoAnycastSID is as follows:
After a device receives an SRv6 packet, if a current active SID in an SRH is an AlgoAnycastSID, the device obtains a network slice ID based on a mapping relationship between the AlgoAnycastSID and the slice ID, and encapsulates the slice ID into an HBH of the packet to guide packet forwarding in the specified slice. The mapping relationship may be shown in the following Table 12:

TABLE 12

| AlgoAnycastSID | Flex-Algo ID |
|---|---|
| Flex-Algo SID-128 | 128 |
| Flex-Algo SID-129 | 129 |
| Flex-Algo SID-130 | 130 |
| Flex-Algo SID-131 | 131 |
| Flex-Algo SID-132 | 132 |
| Flex-Algo SID-133 | 133 |

Similar to "Example 2", the orchestrator may store and manage the following correspondence shown in Table 13:

TABLE 13

| Intent ID | Corresponding slice |
|---|---|
| Intent 1 (assured bandwidth) | Flex-Algo 128 |
| Intent 2 (assured low delay) | Flex-Algo 129 |
| Intent 3 (not through an XXX link) | Flex-Algo XXX |

In the technical solution provided in this example, an aggregation route of the metropolitan area network can be advertised to the core network, and an AlgoAnycastSID locator aggregated by the core network can be advertised to the metropolitan area network. Traffic in the core network is forwarded based on the aggregation route. Therefore, the orchestrator only needs to deliver an intent and does not need to know an edge node of the core network, greatly reducing a requirement of the orchestrator.

In a forwarding process, the headend of the tunnel encapsulates the AlgoAnycastSID into an E2E SRH. However, after the packet leaves the metropolitan area network, for example, Metro1, the tunnel ingress device forwards the packet by searching a routing table based only on a DA, that is, the AlgoAnycastSID, of the packet, and does not care about a node from which the packet enters the core network.

After the traffic enters the core network, a PE that receives the traffic first, such as PE1 or PE2, converts the AlgoAnycastSID into a "Flex-Algo ID" and encapsulates the Flex-Algo ID into an HBH. Another device in the core network searches, based on the "intent ID or Flex-Algo ID" in the HBH, the routing table corresponding to a Flex-Algo for forwarding, that is, traffic is restricted to be forwarded in the network slice.

Compared with Example 2, this solution has the following features and advantages:

1. For a network that supports network slicing, for example, all nodes or all edge nodes in the core network, for example, a PE device, a same AlgoSID is allocated to each slice, in other words, all nodes share one SID in a same Flex-Algo slice. This can save locator addresses and is easier to implement. The AlgoAnycastSID needs to be consistent in the entire subnet.
2. The orchestrator does not need to orchestrate an edge node of the slice network, but only needs to orchestrate a service requirement on the slice network, greatly simplifying processing of the orchestrator.

Example 4: A unified intent SID in an entire network and an SID that can guide a packet forwarding direction, for example, a VPN SID, are for guiding selection of a network slice or a tunnel or direct native IP (Native IP) forwarding for service traffic, with no need to establish a large quantity of E2E tunnels, thereby better resolving a problem of massive tunnels. This example may briefly include the following steps.

1. A tunnel group (that is, an aggregated tunnel) based on a tailend and a mask is established. For example, the tunnel group based on the tailend and the mask is established based on a core network, and a tunnel based on each tailend of a remote network is combined in a current subnet into a tunnel based on a subnet, to reduce a quantity of tunnels to the remote network.
2. Locator routes of all subnets are aggregated and advertised to another network. When a packet enters each subnet, a corresponding policy group is found based on a default route or an aggregated route of a VPNSID of the packet.
3. An orchestrator specifies an intent SID for a target service and sends the SID to a headend of a tunnel. After the packet enters the subnet, the orchestrator finds the corresponding policy group based on the VPNSID, and selects a specific tunnel or slice in the policy group based on an intent ID mapped to the intent SID.

In this example, an example of defining the intent SID is shown in Table 14 below:

TABLE 14

| Code type | Codename | Behavior |
| --- | --- | --- |
| IntentSID | End.Intent | Indicates a special SID of a service SLA. The SID can indicate a service SLA requirement carried in a current network, such as a delay requirement, a bandwidth requirement, and a specific path requirement. |

Behavior of the IntentSID is as follows:

When a device receives an SRv6 packet, and a current active SID in an SRH is the IntentSID, the device obtains, based on a mapping relationship between the IntentSID and a network resource, for example, a network forwarding channel resource such as a network slice, a policy tunnel, and BE forwarding, path indication information of a forwarding channel that meets the service SLA, and guides, based on the path indication information, the packet to be forwarded through a corresponding network channel.

A specific processing manner of the behavior corresponding to the IntentSID includes but is not limited to the following several types:

(1) When the channel resource mapped to the IntentSID is an SRv6 policy, an SRH of the SRv6 policy corresponding to the IntentSID is encapsulated into the packet for forwarding.
(2) When the channel resource mapped to the IntentSID is a network slice, for example, a Flex-Algo or SliceID slice, a slice ID is obtained based on a mapping relationship between the IntentSID and the slice ID, and the slice ID is encapsulated into an HBH of the packet to guide packet forwarding in a specified slice.
(3) When the channel resource mapped to the IntentSID is native IP forwarding, BE forwarding is directly performed based on a VPNSID or a next-hop SID.

Figure 9:
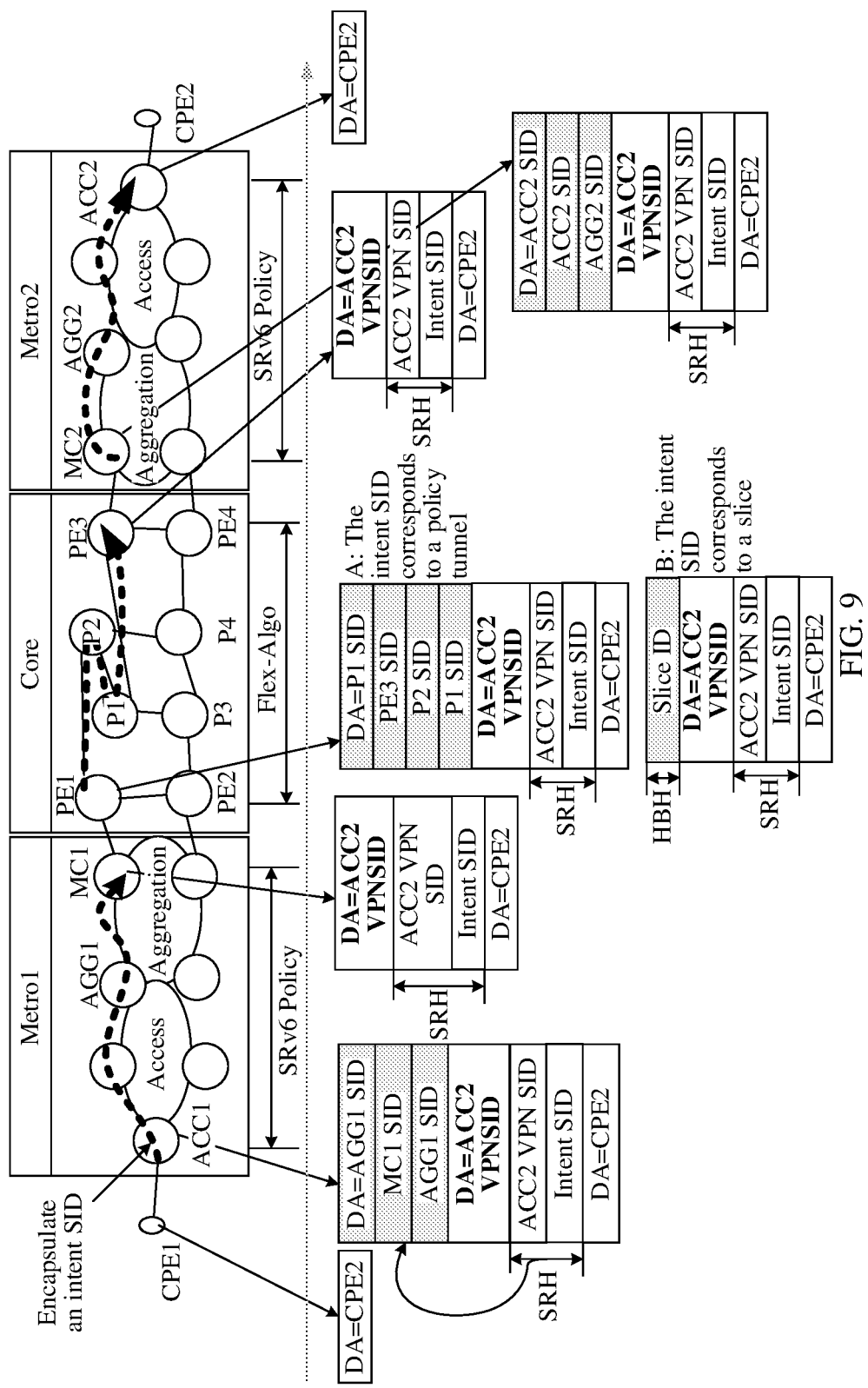
FIG. 9 is an example diagram of application of a packet sending method according to this application.

The following describes this example with reference to FIG. 9. As shown in FIG. 9, an end-to-end tunnel is used, and a packet of a target service forwarded, for example, from CPE1 to CPE2, passing through a core network and a plurality of metropolitan area networks.

(1) In the network shown in FIG. 3, each network may create its own policy group. The policy group may be matched by using a mask and a destination address. The policy group may include an SRv6 policy, a Flex-Algo slice, a SliceID slice, an SRv6 BE, and the like.

The following is an example of a model of a tunnel and a slice type that can be included in the policy group:

For example, in the core network, a policy group 10 can be matched by using an aggregation route of Metro2.

Forwarding models included in the policy group 10 are as follows:

intent ID 1→policy 1 (low delay+high bandwidth)

intent ID 2→policy 2 (low delay+high reliability)+ SliceID 1 intent ID 3→policy 3 (low delay+low jitter)

intent ID 4→Flex-Algo 128 (low delay)

intent ID 5→Flex-Algo 128 (low delay)+SliceID 1 intent ID 6→Flex-Algo 128 (low delay)+SliceID 2 intent ID 7→policy 5 (high bandwidth+ . . . )

intent ID 8→SliceID 1 intent ID 9→SliceID 2 . . .

intent ID N→native ip (BE)

(2) Locators of all subnets are aggregated and advertised to another subnet. MC2 aggregates all locators of Metro2 and advertises an aggregated locator to PE3. PE1 and PE2 in the core network aggregate locators of the core network, advertise an aggregated locator to Metro1, and advertise the aggregated locator of Metro2 to Metro1. Reversely, advertisement from Metro1 to Metro2 is the same.

(3) Metro2: MC2 establishes an intra-AS SRv6 policy tunnel and a policy group to an ACC2 locator, and associates a locator route with the group through precise endpoint/mask matching. Traffic matching the route is classified.

(4) core network: PE1 establishes an SRv6 policy/SRv6 policy group by using the aggregated route of Metro2 as an endpoint (Endpoint), and associates the locator route with the group through precise endpoint/mask (mask) matching. Traffic matching the route is classified.

(5) Metro1: ACC1 establishes an SRv6 policy/SRv6 policy group by using a default route as an endpoint, and associates the locator route with the group through precise endpoint/mask matching. Traffic matching the route is classified.

Figure 10:
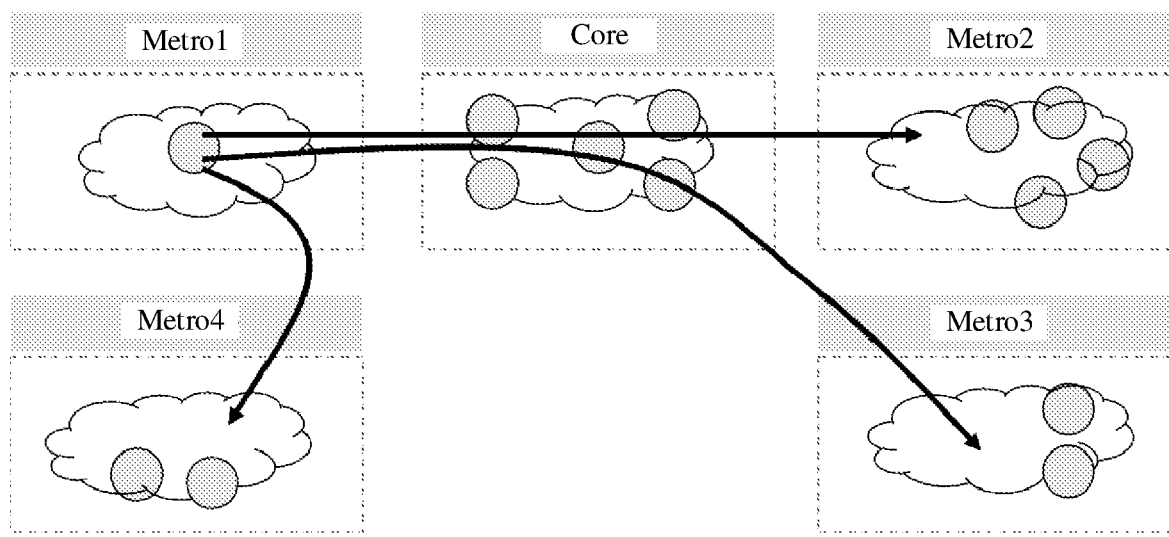
FIG. 10 is an example diagram of a mapping relationship between an aggregation route and an aggregated tunnel according to this application.

As described above, a mapping relationship between an aggregated route and an aggregated tunnel formed between different subnets is shown in FIG. 10.

Routes of Metro1:

Aggregated route of Metro2→policy group 1, where a prefix of the aggregated route of Metro2 may be, for example, prefix1.

Aggregated route of Metro3→policy group 2, where a prefix of the aggregated route of Metro3 may be, for example, prefix2.

Aggregated route of Metro4→policy group 3, where a prefix of the aggregated route of Metro4 may be, for example, prefix3.

Route traffic classification is queried based on the VPN-SID.

Routes of the core:

Aggregated route of Metro1→policy group 1, where a prefix of the aggregated route of Metro1 may be, for example, prefix4.

Aggregated route of Metro2→policy group 2, where a prefix of the aggregated route of Metro2 may be, for example, prefix5.

Aggregated route of Metro3→policy group 3, where a prefix of the aggregated route of Metro2 may be, for example, prefix6.

Aggregated route of Metro4→policy group 4, where a prefix of the aggregated route of Metro2 may be, for example, prefix7.

Route traffic classification is queried based on the VPN-SID.

2. Intent SID Planning

A unified intent SID is planned for an entire network. This SID is not for addressing and carries only a service intent. A special value of a high-order bit of the intent SID may be for identifying that the SID is a special SID carrying an intent ID. An intent ID may indicate forwarding requirements of both the metropolitan area network and the core network. If the metropolitan area network has more intent ID types, the core network needs to set a ratio of intent ID to forwarding tunnel or slice to "N:1". Therefore, network-wide intent SIDs can be planned based on hierarchical aggregation to reduce a quantity of such mapping relationships of "N:1".

The following describes in detail the technical solution provided in this example with reference to a forwarding-plane packet forwarding procedure shown in FIG. 9. The technical solution includes the following steps.

1. After ACC1 in the Metro1 network receives the packet of the target service sent by CPE1, if the DA of the packet is an address of CPE2, ACC1 searches a private routing table based on the DA and finds that the VPNSID corresponding to the packet is ACC2 VPN SID, and searches a routing table based on the SID and matches a default route or an aggregated route. The route is associated with the SRv6 policy group. After ACC1 determines the policy group based on the VPN-SID, ACC1 obtains a stack top SID, for example, an intent SID in the figure, in the SRH based on a configuration requirement, maps the intent SID to a corresponding intent ID, and determines, based on the intent ID, an SRv6 policy or a network slice to which traffic is diverted. If the intent ID is mapped to a policy tunnel, ACC1 encapsulates an SRH of the policy tunnel into the outer layer of the packet. If the intent ID is mapped to a network slice, ACC1 encapsulates a slice ID into an IPv6 HBH, indicating the packet to be forwarded in the specified slice. If native IP forwarding is mapped, the device searches the routing table based only on the VPNSID and forwards the packet through SRv6 BE.

In this example, after obtaining a corresponding segment identifier list (intent SID, ACC2 VPN SID), if the path indication information determined by ACC1 based on the VPN SID and the intent SID is a policy tunnel, that is, a segment identifier list (AGG1 SID, MC1 SID), ACC1 updates the segment identifier list into the packet, so that the packet is forwarded in Metro1 based on the tunnel indicated by the segment identifier list.

2. After the packet is forwarded to MC1 in Metro1 so that the SRv6 policy is terminated or forwarding in a network slice is completed, MC1 matches a default route based on ACC2 VPNSID and forwards the packet to PE1 through BE.

3. After PE1 in the core network receives the packet, PE1 matches the packet with the aggregated route of Metro2 based on the VPNSID and diverts the packet to the aggregated SRv6 policy group in Metro2. After determining the policy group, PE1 obtains a stack top SID, that is, an intent SID, in the SRH based on a configuration requirement, maps the intent SID to a corresponding intent ID, and determines, based on the intent ID, an SRv6 policy or a network slice to which traffic is diverted. If a policy tunnel is mapped, a segment identifier list (P1 SID, P2 SID, PE3 SID) of the policy tunnel is encapsulated into the outer layer of the packet. If a network slice is mapped, a slice ID is encapsulated into an IPv6 HBH, indicating the packet to be forwarded in the specified slice. If native IP forwarding is mapped, the routing table is searched based only on the ACC2 VPNSID and the packet is forwarded through SRv6 BE.

4. After the packet is forwarded to PE3 in the core network based on the foregoing information so that the SRv6 policy is terminated or forwarding in a network slice is completed, routes are aggregated based on the ACC2 VPN SID and the packet is forwarded to MC2 through BE.

5. MC2 in the Metro2 network matches locator route of ACC2 based on the ACC2 VPNSID and diverts the traffic to the corresponding SRv6 policy group. After determining the policy group, ACC2 obtains a stack top intent SID in the SRH based on a configuration requirement, maps the intent SID to a corresponding intent ID, and determines, based on the intent ID, an SRv6 policy or a network slice to which traffic is diverted. If the intent ID directly matches a policy tunnel, for example, (AGG2 SID, ACC2 SID), the packet is forwarded through this tunnel. If a network slice is matched, the slice ID is encapsulated in the IPv6 HBH to indicate the packet to be forwarded in the specified slice. If native IP forwarding is mapped, the routing table is searched based only on the ACC2 VPNSID and the packet is forwarded through SRv6 BE.

Example 5: Each subnet uses an independent intent SID to complete segmented tunnel forwarding. This example is an extension of the foregoing Example 4. Example 4: A unified intent SID is used in the entire network. The intent SID is pushed into a stack top of the SRH of the target service, and is carried from a headend of an end-to-end tunnel to a tailend. An intent ID mapped by the intent SID indicates an SLA requirement for service forwarding, and a VPNSID is for performing packet routing and forwarding. That is, the VPNSID with a routing capability and the intent SID with the service SLA requirement are used together to complete forwarding, so that no E2E tunnel needs to be created in the network. This technical solution requires overall network planning on the intent SID.

This example is further extended based on the foregoing solution. Each subnet is assigned a unique intent SID, and the intent SID is encapsulated in the SRH of the packet in an SID list form to guide packet forwarding. The ingress node of each subnet first records a current intent SID in an SID list of the received target packet as the SID indicating the service SLA, and then the SID list is shifted backwards to a next intent SID. The next intent SID is for searching a routing table and matching a corresponding SRv6 policy group.

Figure 11:
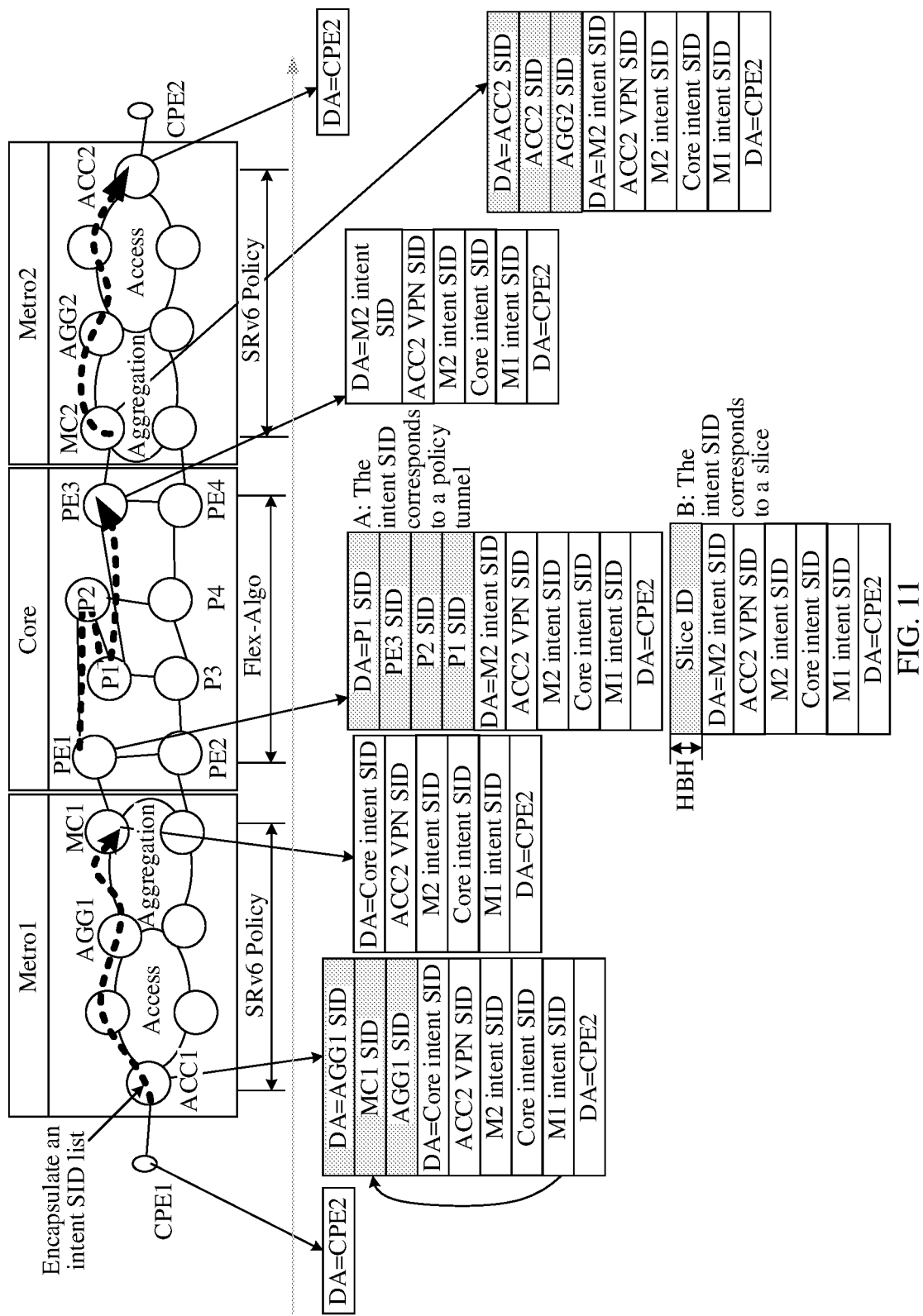
FIG. 11 is an example diagram of application of a packet sending method according to this application.

For a packet forwarding process, refer to FIG. 11.

After ACC1 receives the packet of the target service sent by CPE1, if the DA of the packet is an address of CPE2, ACC1 determines that a segment identifier list corresponding to the packet is (M1intent SID, core intent SID, M2 intent SID), and ACC1 searches a private routing table based on the DA and finds that the VPNSID corresponding to the packet is ACC2 VPN SID, and searches a routing table based on the SID and matches a default route or an aggregated route. The route is associated with the SRv6 policy group. In this case, ACC1 determines, based on the M1 intent SID, that a segment identifier list corresponding to ACC1 is (AGG1 SID, MC1 SID), and encapsulates the segment identifier list into the packet.

When PE1 in the core network receives the packet, a current active SID of the packet is the "core intent SID". PE1 records the "core intent SID" and shifts to a next SID that is the M2 intent SID in the SID list. PE1 matches the packet with the aggregated route of Metro2 based on the "M2 intent SID" and diverts the packet to the aggregated SRv6 policy group in Metro2. After determining the policy group, PE1 maps the recorded "core intent SID" to a corresponding intent ID based on a configuration requirement, and determines, based on the intent ID, an SRv6 policy or a network slice to which traffic is diverted. If a policy tunnel is mapped, a segment identifier list (P1 SID, P2 SID, PE3 SID) of the policy tunnel is encapsulated into the outer layer of the packet. If a network slice is mapped, a slice ID is encapsulated into an IPv6 HBH, indicating the packet to be forwarded in the specified slice. If native IP forwarding is mapped, the routing table is searched based only on the "M2 intent SID" and the packet is forwarded through SRv6 BE.

When MC2 in the Metro2 network receives the packet, a current active SID of the packet is the "M2 intent SID". MC2 records the "M2 intent SID" and shifts to a next SID that is the "ACC2 VPN SID" in the SID list. MC2 matches the packet with the route based on the "ACC2 VPN SID" and diverts the packet to the SRv6 policy group. After determining the policy group, MC2 maps the recorded "M2 intent SID" to a corresponding intent ID based on a configuration requirement, determines, based on the intent ID, a segment identifier list (AGG2 SID, ACC2 SID) corresponding to the SRv6 policy to which traffic is diverted, encapsulates the list in the outer layer of the packet, and forwards the packet.

The forwarding processing in Example 5 differs from that in Example 4 in that forwarding is performed based on the SID list including the intent SID. The intent SID in Example 5 further has the routing capability. The ingress node of each subnet needs to complete the forwarding by combining the current SID with the next SID in the SID list. When the packet is received, the current SID is for identifying the service SLA in the subnet, and the next SID obtained by shifting is for routing and matching the corresponding policy group of the aggregated tunnel. The VPNSID plays a role similar to that of a common SRv6 policy, and is used after the packet reaches a destination.

The foregoing describes the method embodiments provided in this application, and the following describes a network device provided in this application.

This application provides an apparatus (for example, a forwarder/network device). The apparatus has a function of implementing behavior of the network device in the foregoing methods. The function may be implemented based on hardware, or may be implemented based on hardware executing corresponding software. The hardware or the software includes one or more modules corresponding to the foregoing function. For example, refer to FIG. 12, FIG. 13, and FIG. 14 below.

Figure 12:
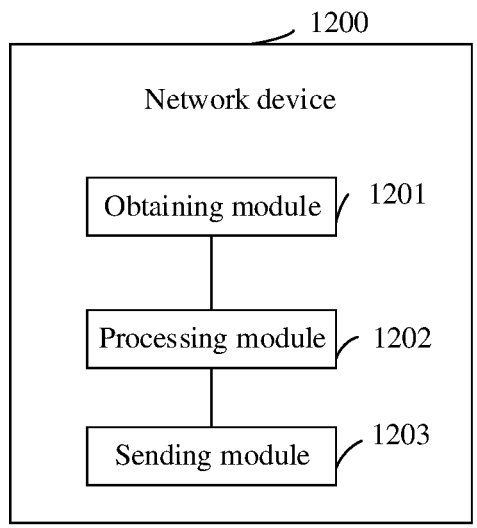
FIG. 12 is a schematic diagram of a structure of a network device according to this application.

FIG. 12 is a schematic diagram of a structure of a network device 1200 according to an embodiment of this application. The network device 1200 may be configured to perform the method performed by the first network device in the method shown in FIG. 4 or FIG. 5. In other words, the network device 1200 may be configured to perform the method performed by the network device, for example, PE1, in any one of the example methods in FIG. 7 to FIG. 11. As shown in FIG. 12, the network device 1200 includes an obtaining module 1201, a processing module 1202, and a sending module 1203. The obtaining module 1201 may be configured to perform a related method for obtaining, by the network device, the first packet including the first identifier in the foregoing method embodiments. The processing module 1202 may be configured to perform a related method in the foregoing methods, such as determining, based on the first identifier, the path indication information corresponding to the first packet and obtaining the second packet. The sending module 1203 may be configured to perform a related method for sending the second packet in the foregoing methods.

It should be noted that, when the network device provided in FIG. 12 performs the foregoing packet sending method, division into the foregoing functional units is merely used as an example for description. During actual application, the foregoing functions may be allocated to different functional units for implementation based on a requirement. In other words, an internal structure of the network device is divided into different functional units, to implement all or some of the functions described above. Alternatively, a unified functional unit is used to complete the functions of the plurality of units. It should be understood that the network device 1200 and the foregoing packet processing method embodiments belong to a same concept. Herein, only steps performed by units of the network device are described by using examples, but it does not mean that the network device does not perform other steps or optional methods in the foregoing embodiments. For a specific implementation process, refer to related descriptions in the foregoing method examples. Details are not described herein again.

Figure 13:
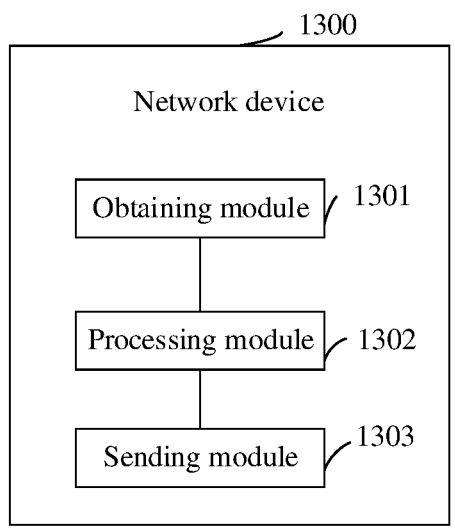
FIG. 13 is a schematic diagram of a structure of a network device according to this application.

FIG. 13 is a schematic diagram of a structure of a network device 1300 according to an embodiment of this application. The network device 1300 may be configured to perform the method performed by the second network device in the method shown in FIG. 4 or FIG. 5. In other words, the network device 1300 may be configured to perform the method performed by the network device, for example, ACC1 or MC1, in any one of the example methods in FIG. 7 to FIG. 11. As shown in FIG. 13, the network device 1300 includes an obtaining module 1301, a processing module 1302, and a sending module 1303. The obtaining module 1301 may be configured to perform a related method for obtaining, by the network device, the first identifier in the foregoing methods. The processing module 1302 may be configured to perform a related method for generating the first packet including the first identifier in the foregoing methods. The sending module 1303 may be configured to perform a related method for sending the first packet in the foregoing methods.

It should be noted that, when the network device provided in FIG. 13 performs the foregoing packet sending method, division into the foregoing functional units is merely used as an example for description. During actual application, the foregoing functions may be allocated to different functional units for implementation based on a requirement. In other words, an internal structure of the network device is divided into different functional units, to implement all or some of the functions described above. Alternatively, a unified functional unit is used to complete the functions of the plurality of units. It should be understood that the network device 1300 and the foregoing packet processing method embodiments belong to a same concept. Herein, only steps performed by units of the network device are described by using examples, but it does not mean that the network device does not perform other steps or optional methods in the foregoing embodiments. For a specific implementation process, refer to related descriptions in the foregoing method examples. Details are not described herein again.

Figure 14:
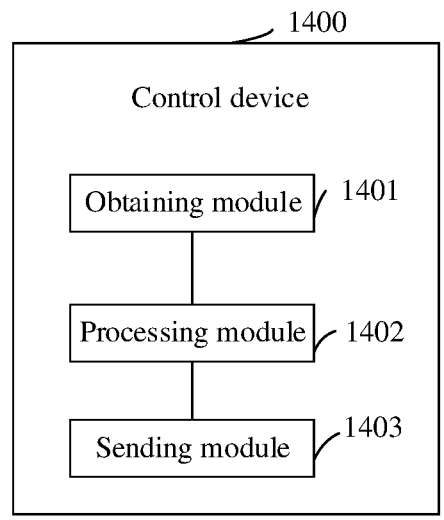
FIG. 14 is a schematic diagram of a structure of a network device according to this application.

FIG. 14 is a schematic diagram of a structure of a control device 1400 according to an embodiment of this application. The control device 1400 may be configured to perform the method performed by the control device in the method shown in FIG. 4, FIG. 5, or FIG. 6. In other words, the control device 1400 may be configured to perform the method performed by the control device in any one of the example methods in FIG. 7 to FIG. 11. As shown in FIG. 14, the network device 1400 includes an obtaining module 1401, a processing module 1402, and a sending module 1403. The obtaining module 1401 may be configured to perform a related method for obtaining, by the control device, the first identifier in the foregoing methods. The processing module 1402 may be configured to perform a related method for determining the first segment identifier list corresponding to the target service in the foregoing methods. The sending module 1403 may be configured to perform a related method for sending the first segment identifier list including the first identifier in the foregoing methods.

It should be noted that, when the control device provided in FIG. 14 performs the foregoing identifier sending method, division into the foregoing functional units is merely used as an example for description. During actual application, the foregoing functions may be allocated to different functional units for implementation based on a requirement. In other words, an internal structure of the control device is divided into different functional units, to implement all or some of the functions described above. Alternatively, a unified functional unit is used to complete the functions of the plurality of units. It should be understood that the control device 1400 and the foregoing identifier sending method embodiments belong to a same concept. Herein, only steps performed by units of the network device are described by using examples, but it does not mean that the control device does not perform other steps or optional methods in the foregoing embodiments. For a specific implementation process, refer to related descriptions in the foregoing method examples. Details are not described herein again.

In correspondence to the method embodiments and the virtual apparatus embodiments provided in this application, an embodiment of this application further provides a network apparatus. The following describes a hardware structure of the network apparatus.

Figure 15:
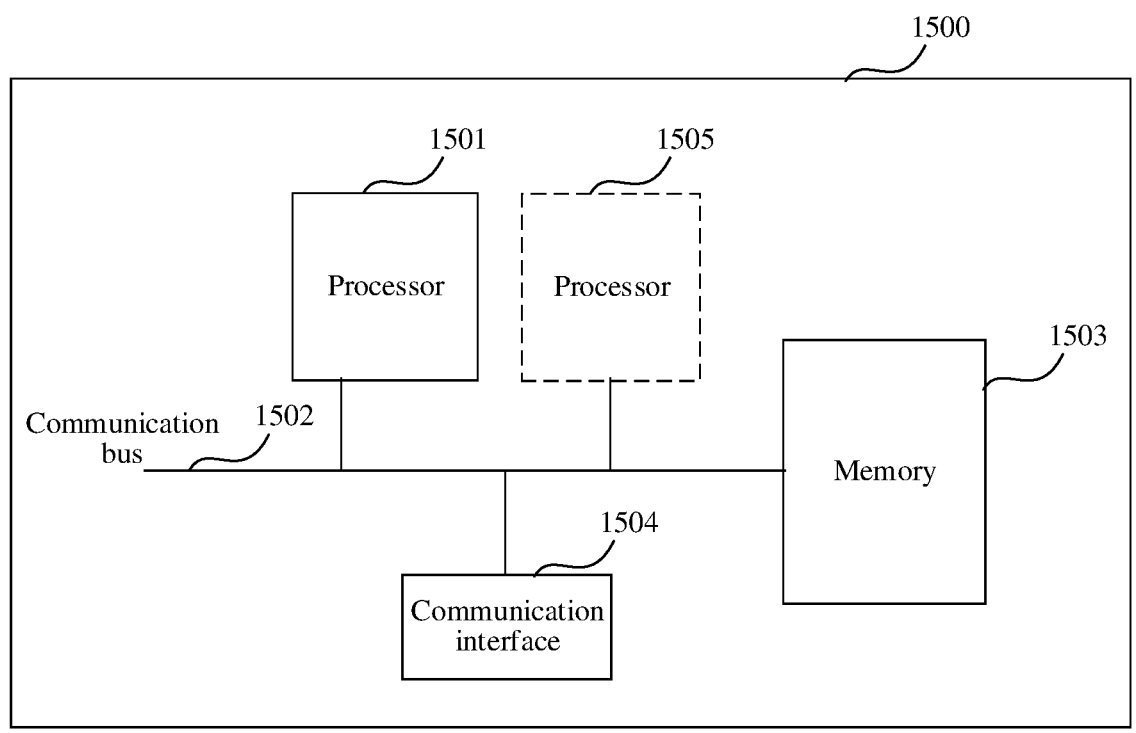
FIG. 15 is a schematic diagram of a structure of a network apparatus according to this application.

FIG. 15 is a schematic diagram of a structure of a network apparatus 1500 according to an embodiment of this application. The apparatus 1500 may perform the methods performed by the first network device, the second network device, or the control device in FIG. 4, FIG. 5, and FIG. 6, or the methods performed by the first network device such as PE1, the second network device such as ACC1 or MC1, or the control device shown in FIG. 7 to FIG. 11. Refer to the schematic diagram of the structure of the apparatus shown in FIG. 15, the apparatus 1500 includes at least one processor 1501, a communication bus 1502, and at least one communication interface 1504. Optionally, the apparatus 1500 may further include a memory 1503.

Optionally, the network apparatus 1500 may be implemented by using a general bus architecture, for example, the communication bus 1502 shown in FIG. 15.

The processor 1501 may be a general-purpose CPU, an NP, a microprocessor, or may be one or more integrated circuits configured to implement the solutions of this application, for example, an application-specific integrated circuit (ASIC), a programmable logic device (PLD), or a combination thereof. The PLD may be a complex programmable logic device (CPLD), a field programmable logic gate array (FPGA), a generic array logic (GAL), or any combination thereof.

The communication bus 1502 is configured to transfer information between the foregoing components. The communication bus 1502 may be classified into an address bus, a data bus, a control bus, and the like. For ease of representation, only one thick line is used to represent the bus in the figure, but this does not mean that there is only one bus or only one type of bus.

The memory 1503 may be a read-only memory (ROM) or another type of static storage device capable of storing static information and instructions, or may be a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile disc, a Blu-ray disc, or the like), a magnetic disk storage medium or another magnetic storage device, or any other medium capable of carrying or storing expected program code in a form of instructions or a data structure and capable of being accessed by a computer. This is not limited thereto. For example, the memory 1503 exists independently, and is connected to the processor 1501 by using the communication bus 1502. Alternatively, the memory 1503 may be integrated into the processor 1501.

The communication interface 1504 is configured to communicate with another device or a communication network by using any apparatus such as a transceiver. The communication interface 1504 includes a wired communication interface, and may further include a wireless communication interface. The wired communication interface may be, for example, an Ethernet interface. The Ethernet interface may be an optical interface, an electrical interface, or a combination thereof. The wireless communication interface may be, for example, a wireless local area network (WLAN) interface, a cellular network communication interface, or a combination thereof. The communication interface 1504 may be further configured to receive a configuration instruction, so that the processor 1501 may obtain a first identifier, obtain a first packet based on the first identifier, and the like according to the configuration instruction. The network apparatus may further include another communication interface, and the another communication interface is for receiving the configuration instruction.

During specific implementation, in an example, the network apparatus 1500 may include a plurality of processors, for example, the processor 1501 and a processor 1505 shown in FIG. 15. Each of the processors may be a single-core processor (single-CPU) or a multi-core processor (multi-CPU). The processor herein may be one or more devices, circuits, and/or processing cores configured to process data (for example, computer program instructions).

In some embodiments, the memory 1503 is configured to store program code 1510 for executing the solutions in this application, and the processor 1501 may execute the program code 1510 stored in the memory 1503. In other words, the network device 1500 may implement the methods provided in the method embodiments by using the processor 1501 and the program code 1510 in the memory 1503.

Figure 16:
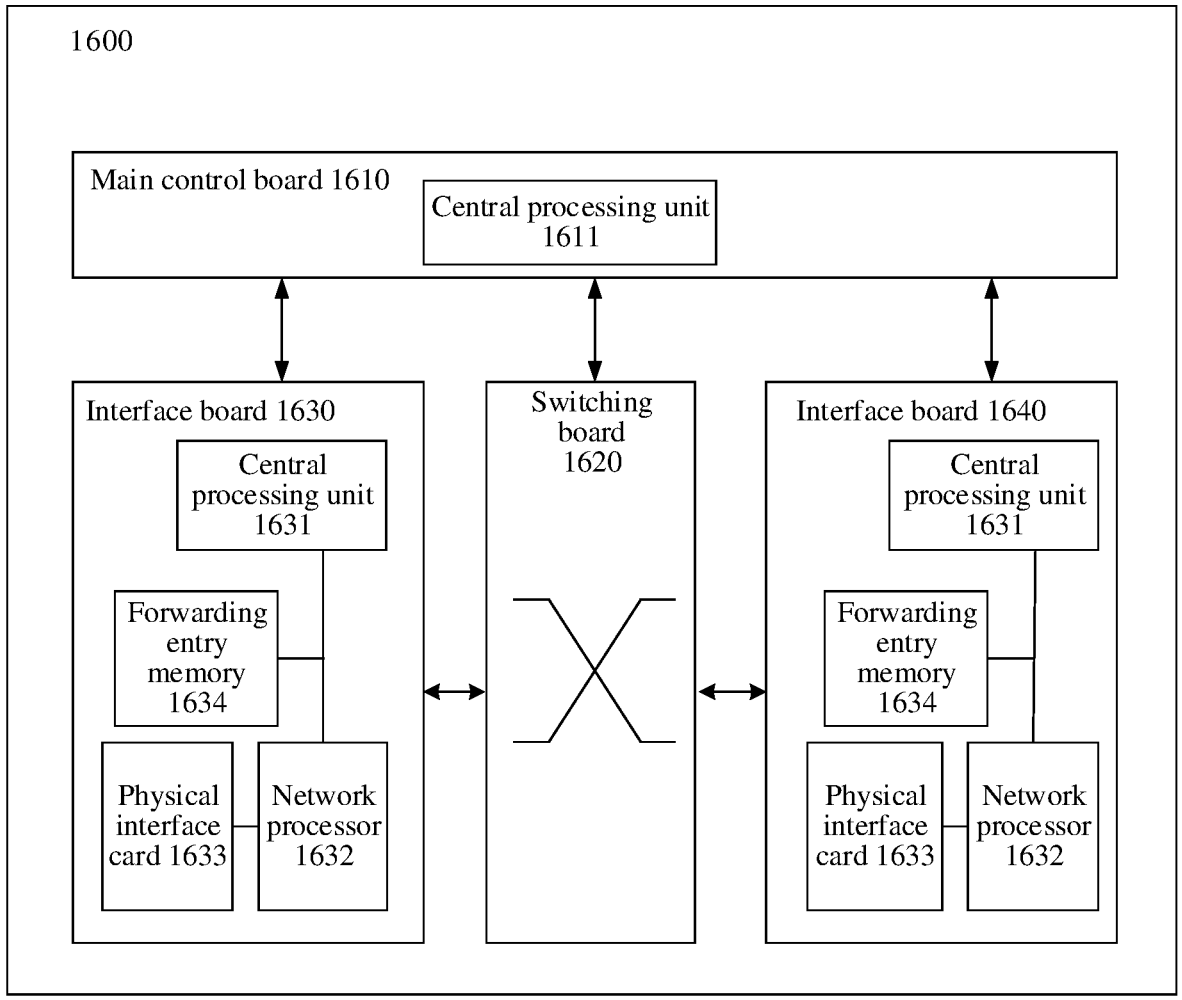
FIG. 16 is a schematic diagram of a structure of a network apparatus according to this application.

FIG. 16 is a schematic diagram of a structure of a network apparatus 1600 according to an embodiment of this application. The apparatus 1600 may perform the methods performed by the first network device, the second network device, or the control device in FIG. 4, FIG. 5, and FIG. 6, or the methods performed by the first network device such as PE1, the second network device such as ACC1 or MC1, or the control device shown in FIG. 7 to FIG. 11. Refer to the schematic diagram of the structure of the apparatus shown in FIG. 16. The apparatus 1600 includes a main control board and one or more interface boards. The main control board and the interface boards are communicatively connected. The main control board is also referred to as a main processing unit (MPU) or a route processor card. The main control board is responsible for controlling and managing each component in the apparatus 1600, including route computation, device management, and function maintenance. The interface board is also referred to as a line processing unit (LPU) or a line card), and is configured to forward data. In some embodiments, the apparatus 1600 may also include a switching board. The switching board is communicatively connected to the main control board and the interface boards. The switching board is configured to forward data between the interface boards. The switching board may also be referred to as a switch fabric unit (SFU). The interface board includes a central processing unit, a memory, a forwarding chip, and a physical interface card (PIC). The central processing unit is communicatively connected to the memory, a network processor, and the physical interface card. The memory is configured to store a forwarding table. The forwarding chip is configured to forward a received packet based on the forwarding table stored in the memory. If a destination address of the packet is an address of the apparatus 1600, the packet is sent to the central processing unit (CPU), for example, a central processing unit 1631, for processing. If the destination address of the packet is not the address of the apparatus 160*o*, a next hop and an outbound interface that correspond to the destination address are found in the forwarding table based on the destination address, and the packet is forwarded to the outbound interface corresponding to the destination address. The forwarding chip may be a network processor (NP). The PIC, also referred to as a subcard, can be installed on the interface board. The PIC is responsible for converting an optical or electrical signal to a data packet, checking validity of the data packet, and forwarding the data packet to the forwarding chip for processing. In some embodiments, the central processing unit may also perform a function of the forwarding chip, for example, implement software forwarding based on a general-purpose CPU, so that the interface board does not need the forwarding chip. A communication connection between the main control board, the interface board, and the switching board may be implemented through a bus. In some embodiments, the forwarding chip may be implemented by using an application-specific integrated circuit (ASIC) or a field programmable gate array (FPGA).

Logically, the apparatus 1600 includes a control plane and a forwarding plane. The control plane includes the main control board and the central processing unit. The forwarding plane includes components for performing forwarding, such as the memory, the PIC, and the NP. The control plane performs functions such as a function of a router, generating the forwarding table, processing signaling and protocol packets, and configuring and maintaining a status of a device. The control plane delivers the generated forwarding table to the forwarding plane. On the forwarding plane, the NP searches a table based on the forwarding table delivered by the control plane, to forward a packet received by the PIC of the apparatus 1600. The forwarding table delivered by the control plane may be stored in the memory. In some embodiments, the control plane and the forwarding plane may be completely separated, and are not on a same device.

It should be noted that, there may be one or more main control boards. When there are a plurality of main control boards, the main control boards may include an active main control board and a standby main control board. There may be one or more interface boards. A network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, a network device such as a low-end switch or router) has a weak data exchange and processing capability. A specific architecture that is to be used depends on a specific networking deployment scenario. This is not limited herein.

In a possible design, this application provides a network device. The network apparatus includes a controller and a first forwarding sub-device. The first forwarding sub-device includes an interface board, and may further include a switching board. The first forwarding sub-device is configured to perform a function of the interface board in FIG. 16, and may further perform a function of the switching board in FIG. 16. The controller includes a receiver, a processor, a transmitter, a random access memory, a read-only memory, and a bus. The processor is coupled to the receiver, the transmitter, the random access memory, and the read-only memory through the bus. When the controller needs to be run, a basic input/output system built into the read-only memory or a bootloader (bootloader) in an embedded system is started, to boot the controller to enter a normal running state. After the controller enters the normal running state, an application program and an operating system are run in the random access memory, to enable the processor to execute a function of the main control board in the foregoing aspect.

Method or algorithm steps described in combination with the content disclosed in this application may be implemented by hardware, or may be implemented by a processor by executing software instructions. The software instructions may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other form well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in user equipment. Certainly, the processor and the storage medium may exist in the user equipment as discrete components.

This application provides a computer storage medium. The computer storage medium is configured to store programs, code, or instructions used by the foregoing network device. When executing the programs, the code, or the instructions, a processor or a hardware device may complete the functions or the steps of the network device.

An embodiment of this application further provides a chip system, including a processor. The processor is coupled to a memory. The memory is configured to store a program or instructions. When the program or the instructions are executed by the processor, the chip system is enabled to implement the method in any one of the foregoing method examples.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated circuit (ASIC), a system on a chip (system on a chip, SoC), a central processing unit (CPU), a network processor (NP), a digital signal processor (DSP), a microcontroller unit (MCU), a programmable logic device (PLD), or another integrated chip.

It should be understood that the steps in the foregoing method examples may be completed by using a hardware integrated logic circuit or instructions in a form of software in the processor. The steps in the methods disclosed with reference to embodiments of this application may be directly performed and completed by a hardware processor, or may be performed and completed by using a combination of hardware in the processor and a software module.

Figure 17:
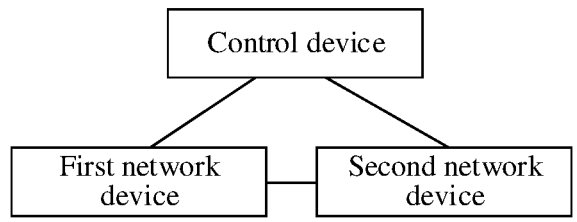
FIG. 17 is a schematic diagram of a network system according to this application.

This application provides a network system. As shown in FIG. 17, the network system includes a first network device and a second network device. The first network device may perform the methods performed by the first network device in FIG. 4, FIG. 5, and FIG. 6, or the methods performed by the first network device such as PE1 shown in FIG. 7 to FIG. 11. The first network device may perform the methods performed by the second network device in FIG. 4, FIG. 5, and FIG. 6, or the methods performed by the second network device such as ACC1 or MC1 shown in FIG. 7 to FIG. 11.

Optionally, the network system further includes a control device. The control device may perform the methods performed by the control devices in FIG. 4, FIG. 5, and FIG. 6, or the methods performed by the control device shown in FIG. 7 to FIG. 11.

Persons skilled in the art should be aware that in the foregoing one or more examples, functions described in this application may be implemented by hardware or a combination of hardware and software. When the functions are implemented by the combination of hardware and software, the software may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

It should be understood that the processor mentioned in embodiments of the present invention may be a central processing unit (CPU), or may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be understood that the memory mentioned in embodiments of the present invention may be a volatile memory or a nonvolatile memory, or may include a volatile memory and a nonvolatile memory. The nonvolatile memory may be a ROM, a PROM, an EPROM, an EEPROM, or a flash memory. The volatile memory may be a random access memory RAM, and serves as an external cache. According to an example but not limiting description, RAMs of many forms are applicable, such as an SRAM, a DRAM, an SDRAM, a DDR SDRAM, an ESDRAM, an SLDRAM, and a DR RAM.

It should be noted that the memory described in this specification aims to include but is not limited to these memories and any memory of another proper type.

Sequence numbers of the foregoing processes do not mean execution sequences in various embodiments of this application. Some or all of the steps may be performed in parallel or in sequence. The execution sequences of the processes should be determined based on functions and internal logic of the processes, and should not be construed as any limitation on the implementation processes of embodiments of this application.

Persons of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, a terminal device, or the like) to perform all or some of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

Related pails of the method embodiments of the present invention may be mutually referenced. The apparatus provided in each apparatus embodiment is configured to perform the method provided in the corresponding method embodiment. Therefore, each apparatus embodiment may be understood with reference to a related part in the related method embodiment.

Structural diagrams of the apparatuses in the apparatus embodiments of the present invention merely show simplified designs of the corresponding apparatuses. In an actual application, the apparatus may include any quantity of transmitters, receivers, processors, memories, and the like, to implement the function or operation performed by the apparatus in each apparatus embodiment of the present invention. However, all apparatuses that can implement this application shall fall within the protection scope of this application.

Names of messages/frames/instruction information, modules or units, and the like provided in the embodiments of the present invention are only examples, and other names may be used provided that functions of the messages/frames/instruction information, the modules or units, and the like are the same.

The terms used in embodiments of the present invention are merely for the purpose of illustrating specific embodiments, and are not intended to limit the present invention. The terms "a" and "the" of singular forms used in embodiments and the appended claims of the present invention are also intended to include plural forms, unless otherwise specified in the context clearly. It should also be understood that, the term "and/or" used herein indicates and includes any or all possible combinations of one or more associated listed items.

In the foregoing specific implementations, the objectives, technical solutions, and benefits of the present invention are further described in detail. It should be understood that different embodiments may be combined, and the foregoing descriptions are merely specific implementations of the present invention, but are not intended to limit the protection scope of the present invention. Any combination, modification, equivalent replacement, improvement, or the like made without departing from the spirit and principle of the present invention shall fall within the protection scope of the present invention. In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method, comprising:
obtaining, by a first network device, a first packet, wherein an internet protocol (IP) extension header of the first packet comprises a first identifier comprising an intent identifier in a hop-by-hop (HBH) options header or a destination options header of the first packet, and wherein the first identifier indicates a service requirement corresponding to the first packet;
determining path indication information corresponding to the first packet based on the first identifier and a first correspondence of a forwarding policy associated with a second identifier, wherein a destination address of the first packet comprises the second identifier in a segment routing header (SRH) of the first packet, wherein the path indication information comprises a network slice identifier, and wherein the forwarding policy is a policy for the first packet and comprises the first correspondence, wherein the first correspondence is a correspondence between the first identifier and the path indication information;
updating the first packet based on the path indication information, to obtain a second packet; and
sending the second packet.

2. The method according to claim 1, wherein the second identifier comprises a segment identifier.

3. The method according to claim 1, wherein determining the path indication information comprises:
determining, based on the first identifier, a third identifier corresponding to the first identifier;
determining the forwarding policy of the first packet based on the second identifier, wherein the forwarding policy comprises a second correspondence between the third identifier and the path indication information; and
determining the path indication information based on the third identifier and the second correspondence.

4. The method according to claim 1, wherein the second packet comprises the path indication information.

5. The method according to claim 4, wherein the path indication information comprises the network slice identifier, and a hop-by-hop (HBH) options header or a destination options header of the second packet comprises the network slice identifier.

6. The method according to claim 1, wherein the first identifier comprises a segment identifier, the segment routing header (SRH) of the first packet comprises the first identifier, and the IP extension header comprises the SRH.

7. The method according to claim 1, wherein the first identifier comprises an intent segment identifier, and the intent segment identifier indicates to the first network device to determine the path indication information based on the first identifier.

8. The method according to claim 1, wherein the IP extension header comprises the HBH or the destination options header.

9. The method according to claim 1, wherein the network slice identifier comprises a slice identifier or a flexible algorithm identifier.

10. The method according to claim 1, wherein the updating the first packet to obtain the second packet comprises encapsulating the path indication information into the first packet to obtain the second packet such that a device that subsequently needs to continue to forward the second packet can forward the second packet based on the path indication information obtained by the first network device.

11. An apparatus, comprising:
at least one processor;
at least one non-transitory computer-readable storage medium storing a program to be executed by the at least one processor, the program including instructions to:
obtain a first packet, wherein an internet protocol (IP) extension header of the first packet comprises a first identifier comprising an intent identifier in a hop-by-hop (HBH) options header or a destination options header of the first packet, and wherein the first identifier indicates a service requirement corresponding to the first packet;
determine path indication information corresponding to the first packet based on the first identifier and a first correspondence of a forwarding policy associated with a second identifier, wherein a destination address of the first packet comprises the second identifier in a segment routing header (SRH) of the first packet, wherein the path indication information comprises a network slice identifier, and wherein the forwarding policy is a policy for the first packet and comprises the first correspondence, wherein the first correspondence is a correspondence between the first identifier and the path indication information;
update the first packet based on the path indication information to obtain a second packet; and
send the second packet.

12. The apparatus according to claim 11, wherein the second identifier comprises a segment identifier.

13. The apparatus according to claim 11, wherein the second packet comprises the path indication information.

14. The apparatus according to claim 11, the first identifier comprises a segment identifier, and the IP extension header comprises the SRH.

15. The apparatus according to claim 11, wherein the first identifier comprises an intent segment identifier, and the intent segment identifier indicates to the apparatus to determine the corresponding path indication information based on the first identifier.

16. The apparatus according to claim 11, wherein the IP extension header comprises the HBH or the destination options header.

17. The apparatus according to claim 11, wherein the network slice identifier comprises a slice identifier or a flexible algorithm identifier.

18. The apparatus according to claim 11, wherein the instructions to update the first packet to obtain the second packet include instructions to encapsulate the path indication information into the first packet to obtain the second packet such that a device that subsequently needs to continue to forward the second packet can forward the second packet based on the path indication information obtained by the apparatus.

19. A non-transitory storage medium storing a program, which when executed by one or more processors, causes the one or more processors to perform operations, the operations comprising:
    obtaining a first packet, wherein an internet protocol (IP) extension header of the first packet comprises a first identifier comprising an intent identifier in a hop-by-hop (HBH) options header or a destination options header of the first packet, and the first identifier indicates a service requirement corresponding to the first packet;
    determining path indication information corresponding to the first packet based on the first identifier and a first correspondence of a forwarding policy associated with a second identifier, wherein a destination address of the first packet comprises the second identifier in a segment routing header (SRH) of the first packet, wherein the path indication information comprises a network slice identifier, and wherein the forwarding policy is a policy for the first packet and comprises the first correspondence, wherein the first correspondence is a correspondence between the first identifier and the path indication information;
    updating the first packet based on the path indication information to obtain a second packet; and
    sending the second packet.

20. The non-transitory storage medium according to claim 19, wherein the operation of updating the first packet to obtain the second packet comprises encapsulating the path indication information into the first packet to obtain the second packet such that a device that subsequently needs to continue to forward the second packet can forward the second packet based on the path indication information obtained by a first network device.

* * * * *